(12) United States Patent
Onoue et al.

(10) Patent No.: US 9,748,042 B2
(45) Date of Patent: Aug. 29, 2017

(54) MULTILAYER FEEDTHROUGH CAPACITOR

(71) Applicant: TDK CORPORATION, Tokyo (JP)

(72) Inventors: Toru Onoue, Tokyo (JP); Takehisa Tamura, Tokyo (JP); Tomonori Sugiyama, Tokyo (JP)

(73) Assignee: TDK CORPORATION, Tokyo (JP)

( * ) Notice: Subject to any disclaimer, the term of this patent is extended or adjusted under 35 U.S.C. 154(b) by 6 days.

(21) Appl. No.: 15/018,027

(22) Filed: Feb. 8, 2016

(65) Prior Publication Data

US 2016/0240319 A1    Aug. 18, 2016

(30) Foreign Application Priority Data

Feb. 12, 2015    (JP) .................................. 2015-025073

(51) Int. Cl.
    *H01G 4/35*    (2006.01)
    *H01G 4/232*   (2006.01)
    *H01G 4/30*    (2006.01)

(52) U.S. Cl.
    CPC .............. *H01G 4/35* (2013.01); *H01G 4/232* (2013.01); *H01G 4/30* (2013.01)

(58) Field of Classification Search
    None
    See application file for complete search history.

(56) References Cited

U.S. PATENT DOCUMENTS

| | | | | |
|---|---|---|---|---|
| 2003/0011962 A1* | 1/2003 | Yamamoto | ............... | H01G 4/30 361/321.2 |
| 2006/0279903 A1* | 12/2006 | Togashi | ................. | H01G 4/232 361/303 |
| 2007/0063330 A1* | 3/2007 | Park | ....................... | H01C 1/148 257/686 |
| 2009/0147489 A1* | 6/2009 | Togashi | ................. | H01G 2/065 361/777 |
| 2009/0207550 A1* | 8/2009 | Feichtinger | ............. | H01G 4/30 361/301.4 |
| 2012/0188684 A1* | 7/2012 | Akazawa | ............... | H01G 4/012 361/321.2 |
| 2012/0250218 A1* | 10/2012 | Togashi | ................... | H01G 4/30 361/302 |

(Continued)

FOREIGN PATENT DOCUMENTS

JP    H03-73422 U    7/1991

*Primary Examiner* — Dion R Ferguson
(74) *Attorney, Agent, or Firm* — Oliff PLC

(57) ABSTRACT

An element body includes principal surfaces opposing each other in a first direction, first side surfaces opposing each other in a second direction perpendicular to the first direction, and second side surfaces opposing each other in a third direction perpendicular to the first and second directions. A length in the first direction of the element body is smaller than a length in the second direction of the element body and a length in the third direction of the element body. Each of the first and second terminal signal electrodes and the terminal ground electrode includes an electrode portion disposed on the principal surface. A thickness of the electrode portion of the terminal ground electrode is smaller than a thickness of the electrode portion of the first terminal signal electrode and smaller than a thickness of the electrode portion of the second terminal signal electrode.

16 Claims, 26 Drawing Sheets

(56) References Cited

U.S. PATENT DOCUMENTS

| | | | |
|---|---|---|---|
| 2015/0041193 A1* | 2/2015 | Lee | H01G 4/12 174/258 |
| 2015/0109718 A1* | 4/2015 | Choi | H01G 2/06 361/304 |
| 2015/0116900 A1* | 4/2015 | Sawada | H01G 4/012 361/301.4 |

* cited by examiner

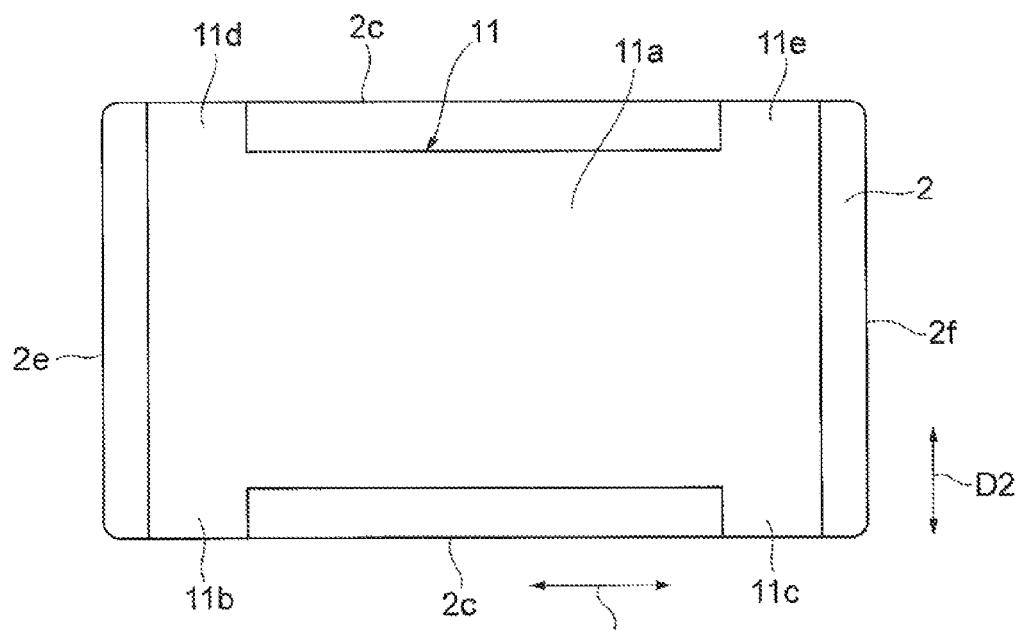
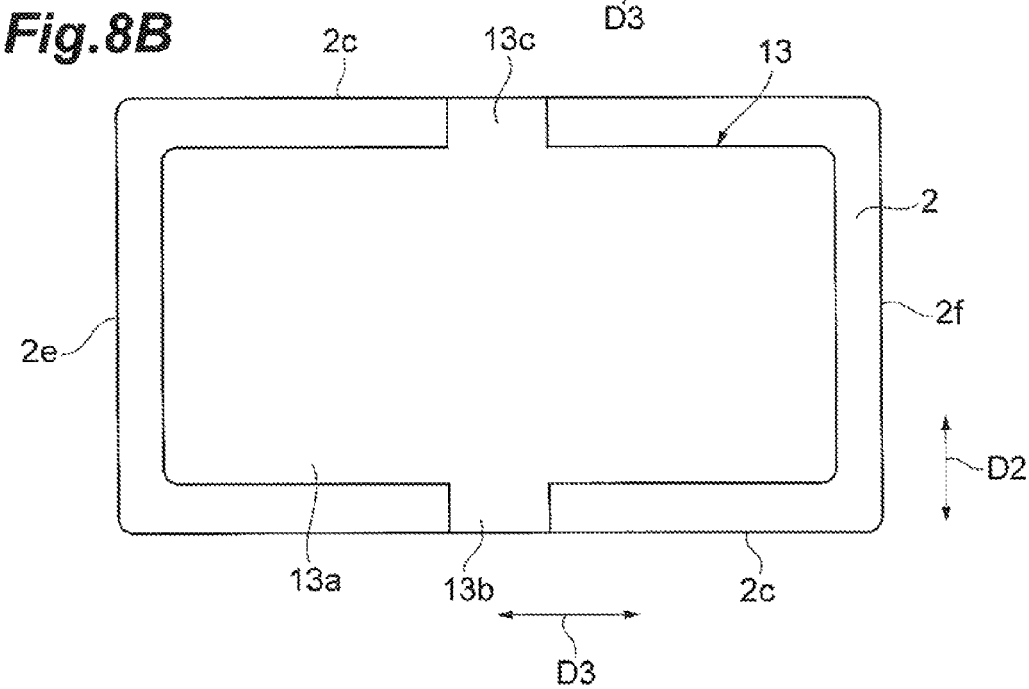

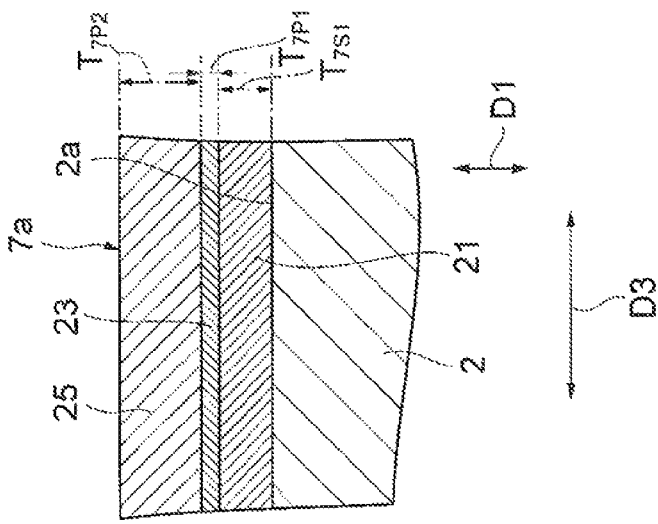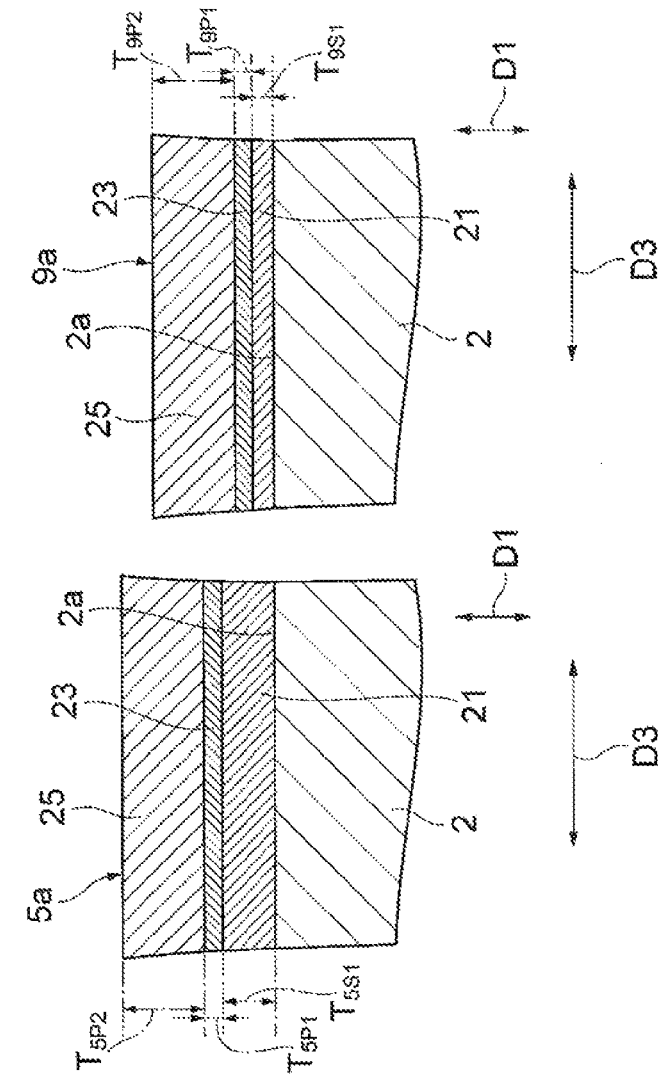

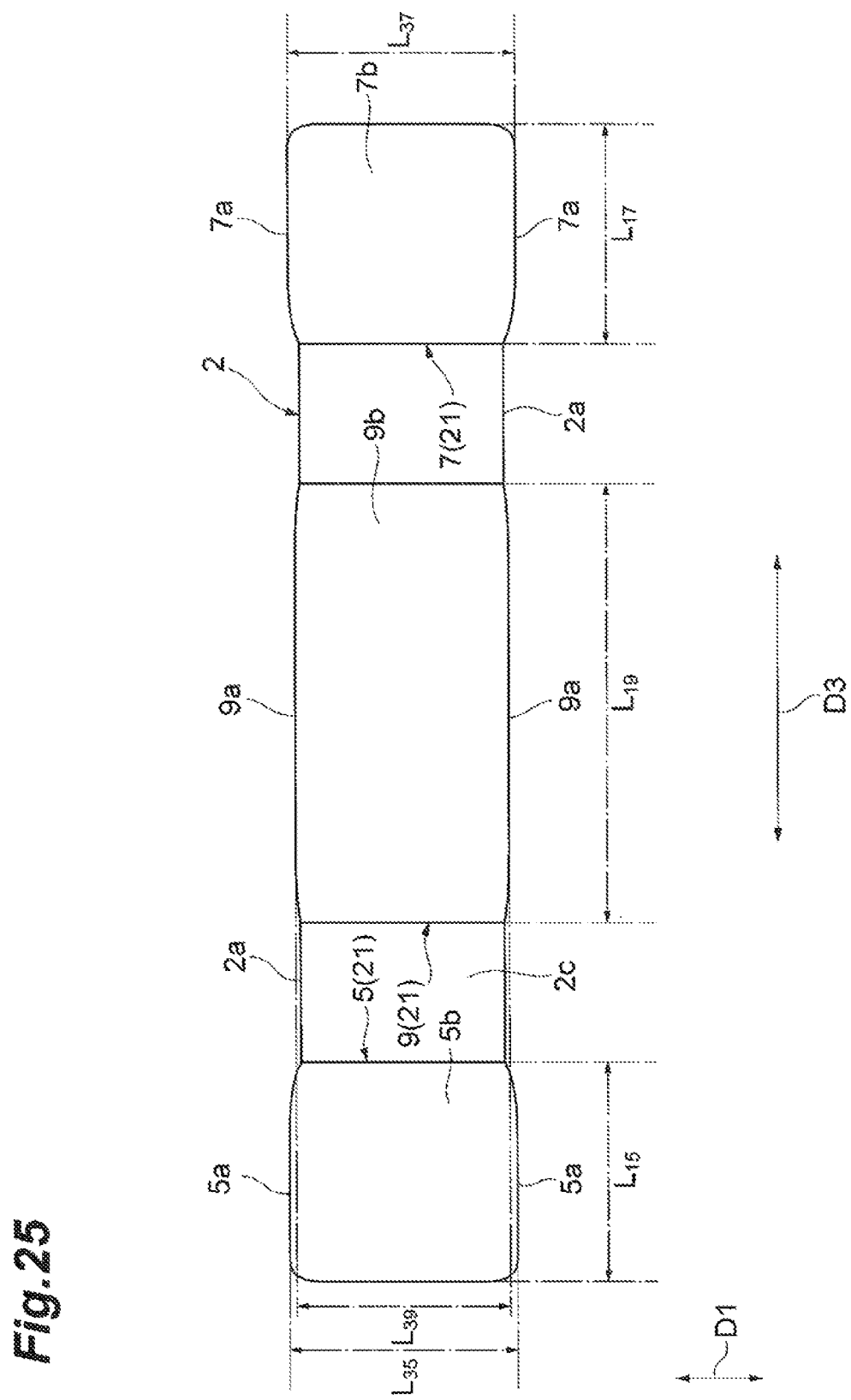

MULTILAYER FEEDTHROUGH CAPACITOR

TECHNICAL FIELD

The present invention relates to a multilayer feedthrough capacitor.

BACKGROUND

Known multilayer feedthrough capacitors include an element body of a rectangular parallelepiped shape, a plurality of internal signal electrodes, a plurality of internal ground electrodes, first and second terminal signal electrodes, and a terminal ground electrode (e.g., cf. Japanese Unexamined Utility Model Publication No. H03-073422). The plurality of internal signal electrodes and the plurality of internal ground electrodes are alternately disposed in the element body to oppose each other. The first and second terminal signal electrodes are disposed on the element body and connected to the plurality of internal signal electrodes. The terminal ground electrode is disposed on the element body and connected to the plurality of internal ground electrodes.

SUMMARY

Electronic equipment such as information terminal devices has been becoming smaller and thinner. In conjunction therewith, substrates mounted on the electronic equipment and electronic components mounted on the substrates have been downsized and mounted in higher density. Substrates with built-in electronic components have been developed for further reduction in size of the electronic equipment. In such substrates with built-in electronic components, the electronic components are mounted on the substrate to be embedded therein. The embedded electronic component needs to be securely electrically connected to wiring formed on the substrate. In the case of the multilayer feedthrough capacitor described in Japanese Unexamined Utility Model Publication No. H03-073422, however, no consideration is given to embedment in the substrate (built-in mounting in the substrate) and electrical connection to the wiring formed on the substrate.

One aspect of the present invention provides a multilayer feedthrough capacitor that can be suitably built into a substrate.

A multilayer feedthrough capacitor according to one aspect of the present invention includes an element body of a rectangular parallelepiped shape, a plurality of internal signal electrodes, a plurality of internal ground electrodes, a first terminal signal electrode, a second terminal signal electrode, and a terminal ground electrode. The element body includes a pair of principal surfaces opposing each other in a first direction, a pair of first side surfaces opposing each other in a second direction perpendicular to the first direction, and a pair of second side surfaces opposing each other in a third direction perpendicular to the first and second directions. The plurality of internal signal electrodes and the plurality of internal ground electrodes are alternately disposed in the element body to oppose each other in the first direction. The first and second terminal signal electrodes are disposed on the element body and connected to the plurality of internal signal electrodes. The terminal ground electrode is disposed on the element body and connected to the plurality of internal ground electrodes. A length in the first direction of the element body is smaller than a length in the second direction of the element body and smaller than a length in the third direction of the element body. The terminal ground electrode is located between the first terminal signal electrode and the second terminal signal electrode in the third direction. Each of the first and second terminal signal electrodes and the terminal ground electrode includes an electrode portion disposed on one of the principal surfaces. A thickness of the electrode portion of the terminal ground electrode is smaller than a thickness of the electrode portion of the first terminal signal electrode and smaller than a thickness of the electrode portion of the second terminal signal electrode.

In the multilayer feedthrough capacitor according to the one aspect, the length in the first direction of the element body is smaller than the length in the second direction of the element body and smaller than the length in the third direction of the element body. For this reason, the multilayer feedthrough capacitor is obtained that has reduced height and the multilayer feedthrough capacitor is realized that is suitable for built-in mounting in a substrate. The first and second terminal signal electrodes and the terminal ground electrode include their respective electrode portions disposed on one of the principal surfaces of the element body. The multilayer feedthrough capacitor according to the one aspect can be electrically connected to wiring formed on the substrate, on the one principal surface side of the element body. Therefore, the multilayer feedthrough capacitor according to the one aspect can be readily built into the substrate.

In a process of mounting the multilayer feedthrough capacitor on the substrate, a space around the multilayer feedthrough capacitor is filled with a resin. The terminal ground electrode is located between the first terminal signal electrode and the second terminal signal electrode in the third direction. If the thickness of the electrode portion of the terminal ground electrode is equivalent to the thickness of the electrode portion of the first terminal signal electrode and equivalent to the thickness of the electrode portion of the second terminal signal electrode, the electrode portion of the terminal ground electrode will be located on a virtual plane being parallel to the one principal surface of the element body and including the surfaces of the electrode portions of the first and second terminal signal electrodes. In this case, there will be no sufficient space formed for the resin to flow in, around the terminal ground electrode and, for this reason, in a process of filling the space around the multilayer feedthrough capacitor with the resin, the resin will be less likely to flow to around the terminal ground electrode. It can result in failing to fully fill the space around the terminal ground electrode with the resin and generating an air gap. As a result, there is a possibility of failing to suitably build the multilayer feedthrough capacitor into the substrate.

In the multilayer feedthrough capacitor according to the one aspect, the thickness of the electrode portion of the terminal ground electrode is smaller than the thickness of the electrode portion of the first terminal signal electrode and smaller than the thickness of the electrode portion of the second terminal signal electrode, and thus the electrode portion of the terminal ground electrode is located away from the aforementioned virtual plane. Since a space is formed for the resin to flow therein, around the terminal ground electrode, the resin is likely to flow to around the terminal ground electrode, in the process of filling the space around the multilayer feedthrough capacitor with the resin. The generation of the air gap around the terminal ground electrode is suppressed in the process of filling the space around the multilayer feedthrough capacitor with the resin.

As a result, it is feasible to suitably build the multilayer feedthrough capacitor according to the one aspect into the substrate.

The thickness of the electrode portion of the terminal ground electrode may be not more than 90% of the thicknesses of the electrode portions of the first and second terminal signal electrodes. In this case, the resin is more likely to flow to around the terminal ground electrode, and thus it is feasible to certainly suppress the generation of the air gap around the terminal ground electrode.

Each of the first and second terminal signal electrodes and the terminal ground electrode may include a sintered conductor layer formed on the element body, and a plated layer formed on the sintered conductor layer. In this case, a thickness of the sintered conductor layer of the electrode portion of the terminal ground electrode may be not more than a thickness of the sintered conductor layer of the electrode portion of the first terminal signal electrode and not more than a thickness of the sintered conductor layer of the electrode portion of the second terminal signal electrode. An area of the sintered conductor layer of the terminal ground electrode may be smaller than a total value of an area of the sintered conductor layer of the first terminal signal electrode and an area of the sintered conductor layer of the second terminal signal electrode.

A plated layer of an electronic component is generally formed on a sintered conductor layer by a barrel plating method. The barrel plating method is performed using electroconductive media. The media are brought into contact with the sintered conductor layer, whereby an electric current flows through the sintered conductor layer, so as to deposit the plated layer on the sintered conductor layer.

The Inventors discovered that the area of the sintered conductor layer was associated with the thickness of the plated layer formed on the sintered conductor layer. When the area of the sintered conductor layer is large, a contact probability of the media is higher than when the area of the sintered conductor layer is small. For this reason, the thickness of the plated layer formed on the sintered conductor layer having the large area is larger than the thickness of the plated layer formed on the sintered conductor layer having the small area. If the areas of respective sintered conductor layers are equivalent, the thicknesses of plated layers formed on the respective sintered conductor layers will be equivalent.

The first terminal signal electrode and the second terminal signal electrode are electrically connected through the internal signal electrodes. When the area of the sintered conductor layer of the terminal ground electrode is smaller than the total value of the area of the sintered conductor layer of the first terminal signal electrode and the area of the sintered conductor layer of the second terminal signal electrode, the thickness of the plated layer formed on the sintered conductor layer of the electrode portion of the terminal ground electrode is smaller than the thicknesses of the respective plated layers formed on the sintered conductor layers of the electrode portions of the first and second terminal signal electrodes.

Therefore, when the thickness of the sintered conductor layer of the electrode portion of the terminal ground electrode is not more than the thickness of the sintered conductor layer of the electrode portion of the first terminal signal electrode and not more than the thickness of the sintered conductor layer of the electrode portion of the second terminal signal electrode, the thickness of the electrode portion of the terminal ground electrode is smaller than the thickness of the electrode portion of the first terminal signal electrode and smaller than the thickness of the electrode portion of the second terminal signal electrode. When the areas of the respective terminal electrodes and the thicknesses of the respective sintered conductor layers are set in the aforementioned relationships, the thickness of the electrode portion of the terminal ground electrode readily becomes smaller than the thicknesses of the respective electrode portions of the first and second terminal signal electrodes.

The thickness of the sintered conductor layer of the electrode portion of the terminal ground electrode may be smaller than the thickness of the sintered conductor layer of the electrode portion of the first terminal signal electrode and smaller than the thickness of the sintered conductor layer of the electrode portion of the second terminal signal electrode. The area of the sintered conductor layer of the terminal ground electrode may be equivalent to the total value of the area of the sintered conductor layer of the first terminal signal electrode and the area of the sintered conductor layer of the second terminal signal electrode.

When the total value of the area of the sintered conductor layer of the first terminal signal electrode and the area of the sintered conductor layer of the second terminal signal electrode is equivalent to the area of the sintered conductor layer of the terminal ground electrode, the thickness of the plated layer formed on the sintered conductor layer of the electrode portion of the first terminal signal electrode, the thickness of the plated layer formed on the sintered conductor layer of the electrode portion of the second terminal signal electrode, and the thickness of the plated layer formed on the sintered conductor layer of the electrode portion of the terminal ground electrode are equivalent.

Therefore, when the thickness of the sintered conductor layer of the electrode portion of the terminal ground electrode is smaller than the thickness of the sintered conductor layer of the electrode portion of the first terminal signal electrode and smaller than the thickness of the sintered conductor layer of the electrode portion of the second terminal signal electrode, the thickness of the electrode portion of the terminal ground electrode is smaller than the thickness of the electrode portion of the first terminal signal electrode and smaller than the thickness of the electrode portion of the second terminal signal electrode. When the areas of the respective terminal electrodes and the thicknesses of the respective sintered conductor layers are set in the aforementioned relationships, the thickness of the electrode portion of the terminal ground electrode readily becomes smaller than the thicknesses of the respective electrode portions of the first and second terminal signal electrodes.

The sintered conductor layer may contain Cu or Ni. The plated layer may include a first plated layer formed on the sintered conductor layer, and a second plated layer formed on the first plated layer. In this case, the first plated layer contains Ni or Sn, and the second plated layer contains Cu or Au. In this embodiment, since the internal signal electrodes are connected to the sintered conductor layers of the first and second terminal signal electrodes, the internal signal electrodes are kept in secure contact with the first and second terminal signal electrodes. Since the internal ground electrodes are connected to the sintered conductor layer of the terminal ground electrode, the internal ground electrodes are kept in secure contact with the terminal ground electrode. Since the second plated layer contains Cu or Au, it is feasible to further ensure connectivity between the wiring formed on the substrate and the first and second terminal signal electrodes and the terminal ground electrode. The first plated layer prevents the sintered conductor layer from being damaged by a plating solution during formation of the second plated layer. For this reason, it is feasible to suppress degradation of insulation resistance of the multilayer feedthrough capacitor.

Each of the first and second terminal signal electrodes and the terminal ground electrode may include an electrode portion disposed on one of the first side surfaces. Each of the plurality of internal signal electrodes may include a pair of connection portions connected to the respective electrode portions of the first and second terminal signal electrodes disposed on the one first side surface. Each of the plurality of internal ground electrodes may include a connection portion connected to the electrode portion of the terminal ground electrode disposed on the one first side surface. In this case, all of the connection portions are exposed at the one first side surface. When the first and second terminal signal electrodes and the terminal ground electrode include their respective electrode portions disposed on the same first side surface, the first and second terminal signal electrodes and the terminal ground electrode are disposed in a state in which they are close to each other. This makes electric current paths shorter in the multilayer feedthrough capacitor, thereby achieving a reduction in Equivalent Series inductance (ESL).

Each of the first and second terminal signal electrodes and the terminal ground electrode may include an electrode portion disposed on an other of the principal surfaces. In this case, the multilayer feedthrough capacitor can also be electrically connected to the wiring formed on the substrate, on the other principal surface side of the element body.

Each of the first and second terminal signal electrodes and the terminal ground electrode may include electrode portions disposed on the pair of first side surfaces, and an electrode portion disposed on an other of the principal surfaces. The electrode portion disposed on the one principal surface and the electrode portion disposed on each of the first side surfaces may be connected at a ridgeline between the one principal surface and each first side surface. The electrode portion disposed on the other principal surface and the electrode portion disposed on each of the first side surfaces may be connected at a ridgeline between the other principal surface and each first side surface. Each of the plurality of internal signal electrodes may include a pair of connection portions connected to the respective electrode portions of the first terminal signal electrode disposed on the pair of first side surfaces, and a pair of connection portions connected to the respective electrode portions of the second terminal signal electrode disposed on the pair of first side surfaces. Each of the plurality of internal ground electrodes may include connection portions connected to the electrode portions of the terminal ground electrode disposed on the pair of first side surfaces. In this case, each of the connection portions is exposed at the corresponding first side surface. In the multilayer feedthrough capacitor of this embodiment, electric current paths are formed from the pair of first side surface sides. The multilayer feedthrough capacitor where the electric current paths are formed from the pair of first side surface sides has a larger number of electric current paths than a multilayer feedthrough capacitor where electric current paths are formed from only one first side surface side. Therefore, the multilayer feedthrough capacitor of this embodiment can achieve reduction in ESL and reduction in Equivalent Series Resistance (ESR).

The first and second terminal signal electrodes may be disposed at ends in the third direction of the element body. In this case, the first and second terminal signal electrodes may include no electrode portion disposed on either of the second side surfaces. When the first and second terminal signal electrodes include no electrode portion disposed on either of the pair of second side surfaces, the area of the electrode portions disposed on the principal surface can be set larger than in a case where the first and second terminal signal electrodes include their respective electrode portions formed on the pair of second side surfaces. For this reason, it is feasible to enhance the connectivity between the first and second terminal signal electrodes and the wiring formed on the substrate.

An area of the terminal ground electrode may be smaller than a total value of an area of the first terminal signal electrode and an area of the second terminal signal electrode.

The area of the terminal ground electrode may be equivalent to the total value of the area of the first terminal signal electrode and the area of the second terminal signal electrode.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 8A is a plan view showing an internal signal electrode and FIG. 8B a plan view showing an internal ground electrode.

FIG. 23A is a drawing for explaining a cross-sectional configuration of an electrode portion of a first terminal signal electrode, FIG. 23B a drawing for explaining a cross-sectional configuration of an electrode portion of a second terminal signal electrode, and FIG. 23C a drawing for explaining a cross-sectional configuration of an electrode portion of a terminal ground electrode.

FIG. 25 is a side view of the element body on which the first electrode layers are formed.

DETAILED DESCRIPTION

Embodiments of the present invention will be described below in detail with reference to the accompanying drawings. In the description, the same elements or elements with the same functionality will be denoted by the same reference signs, without redundant description.

Figure 1:
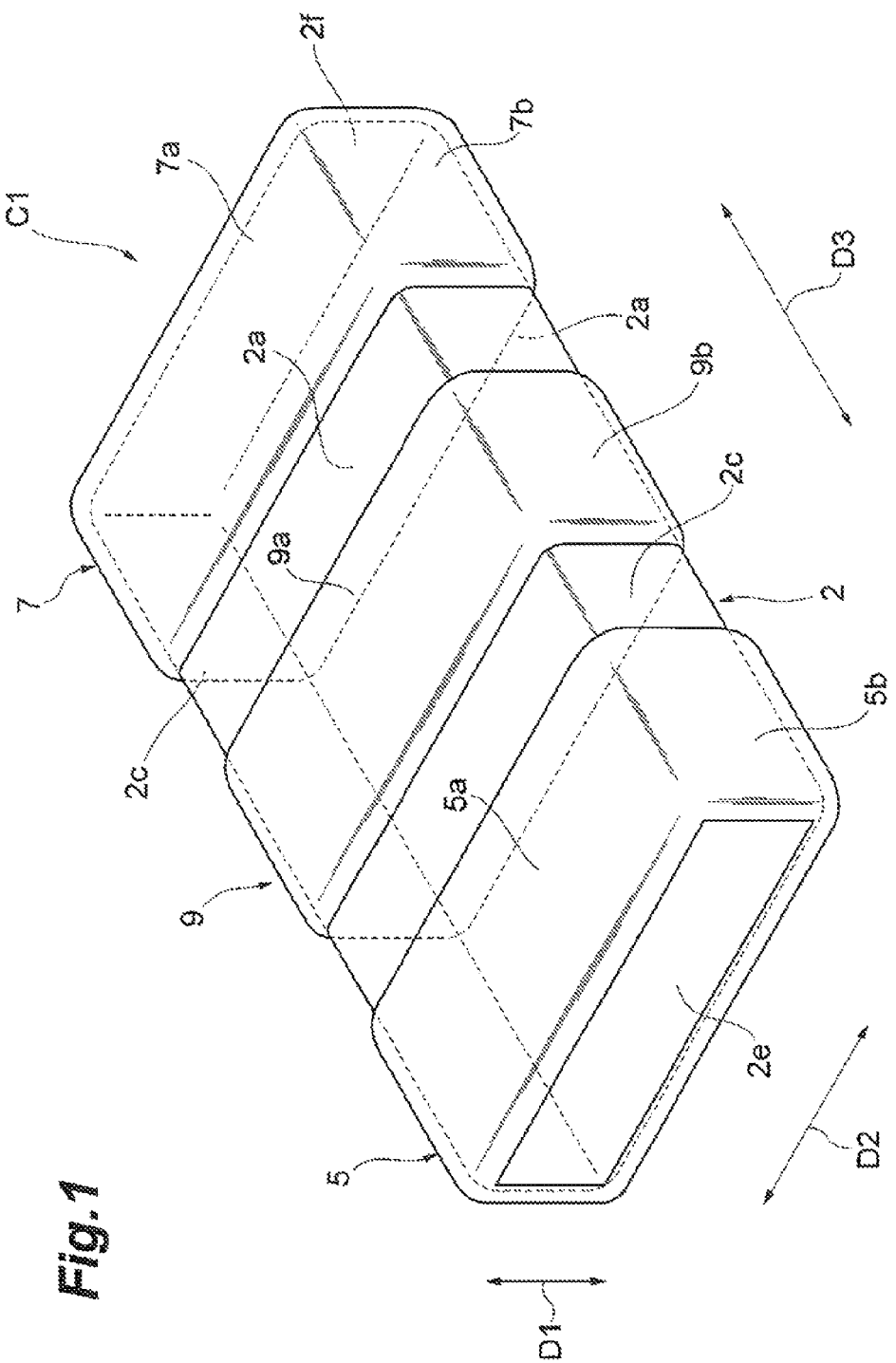
FIG. 1 is a perspective view showing a multilayer feedthrough capacitor according to one embodiment.
Figure 2:
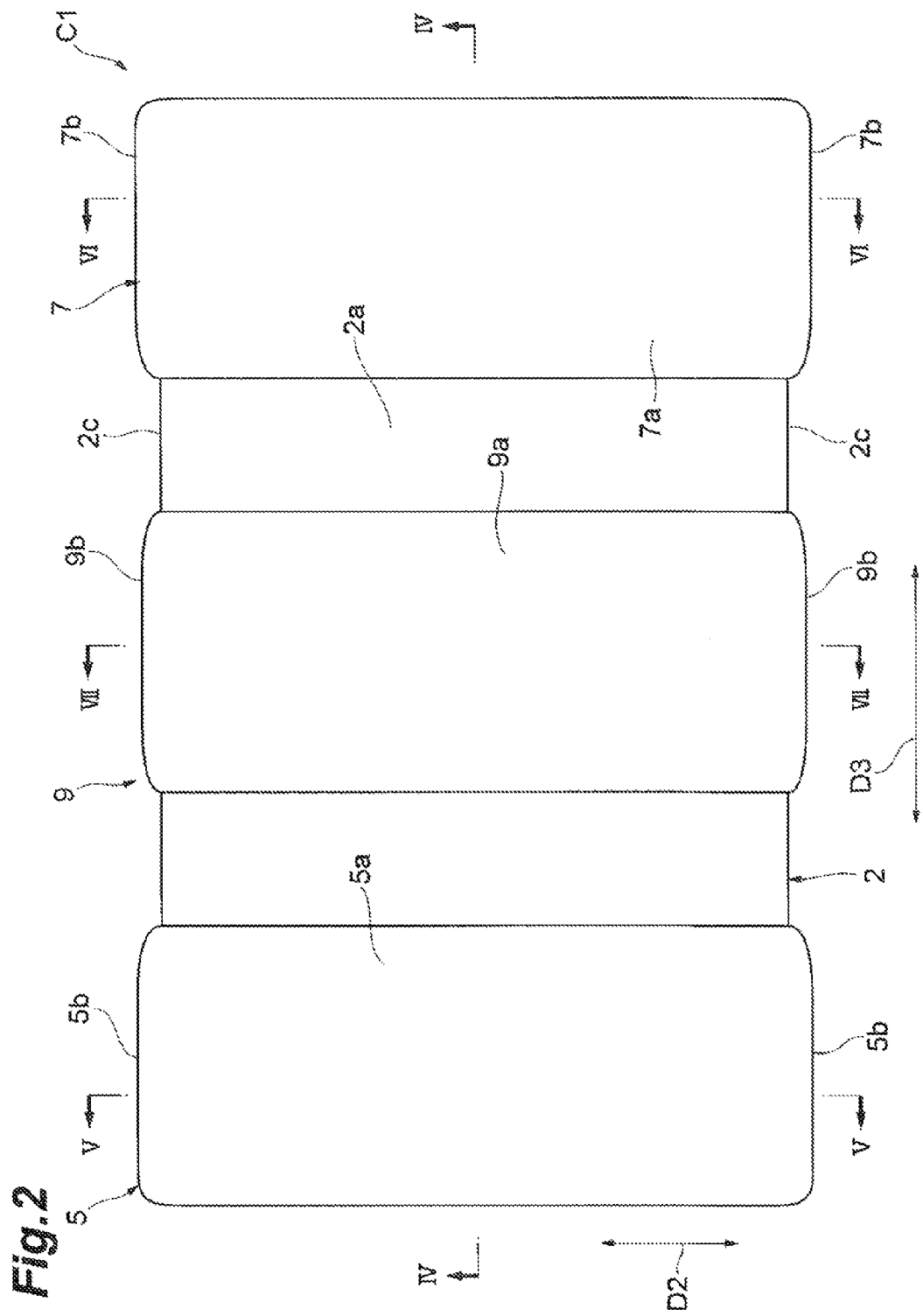
FIG. 2 is a plan view showing the multilayer feedthrough capacitor according to the embodiment.
Figure 3:
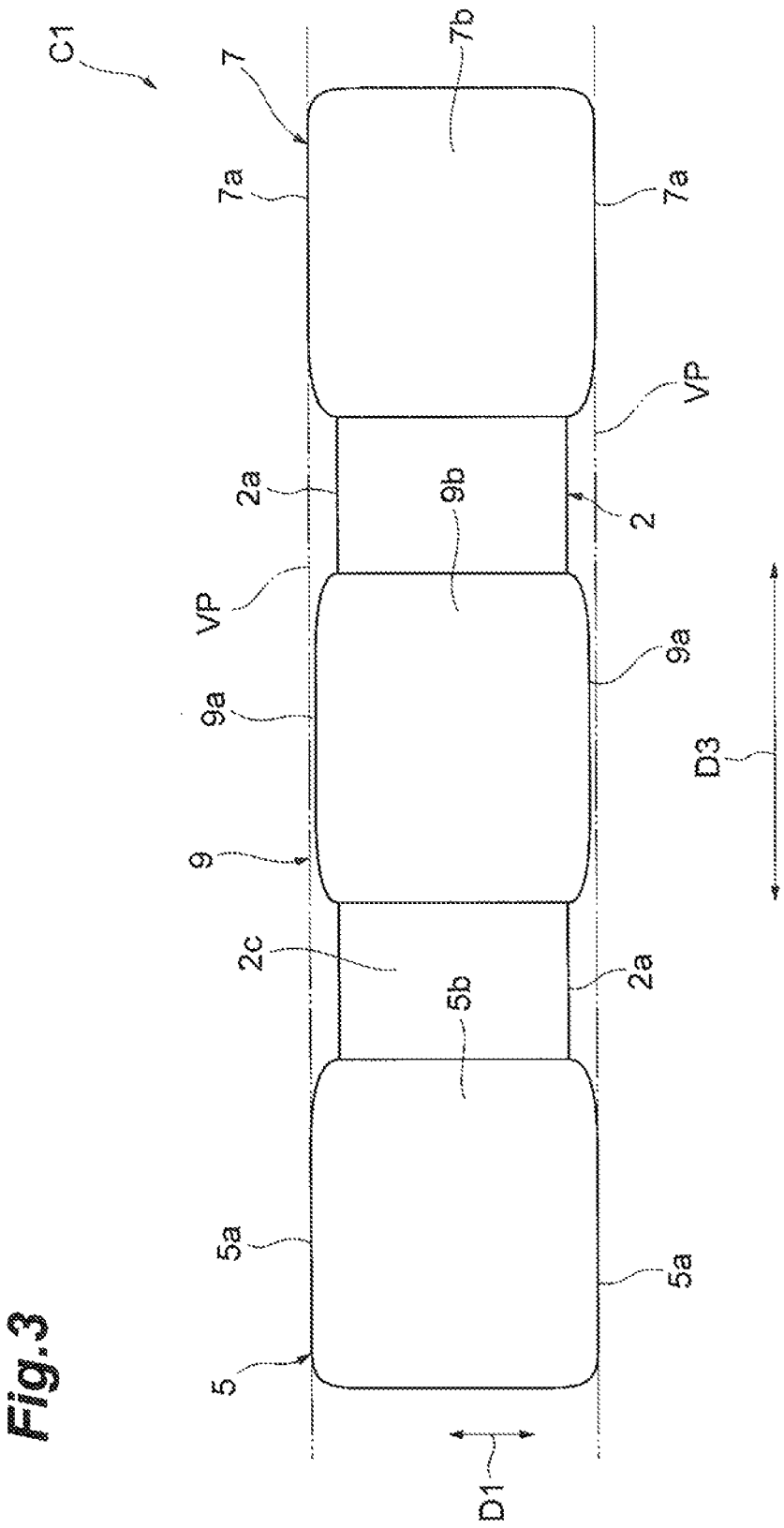
FIG. 3 is a side view showing the multilayer feedthrough capacitor according to the embodiment.
Figure 4:
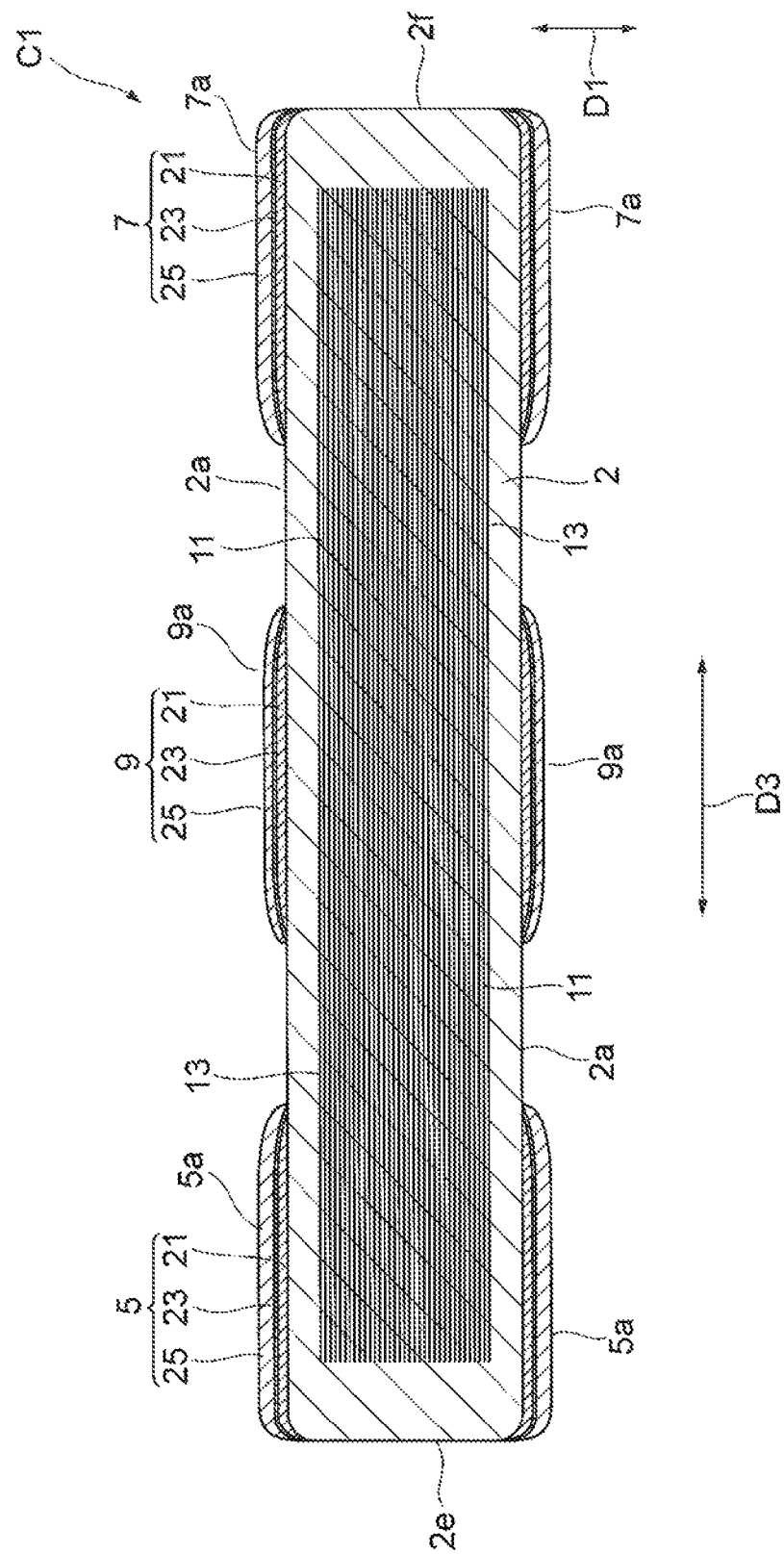
FIG. 4 is a drawing for explaining a cross-sectional configuration along the line IV-IV in FIG. 2.
Figure 5:
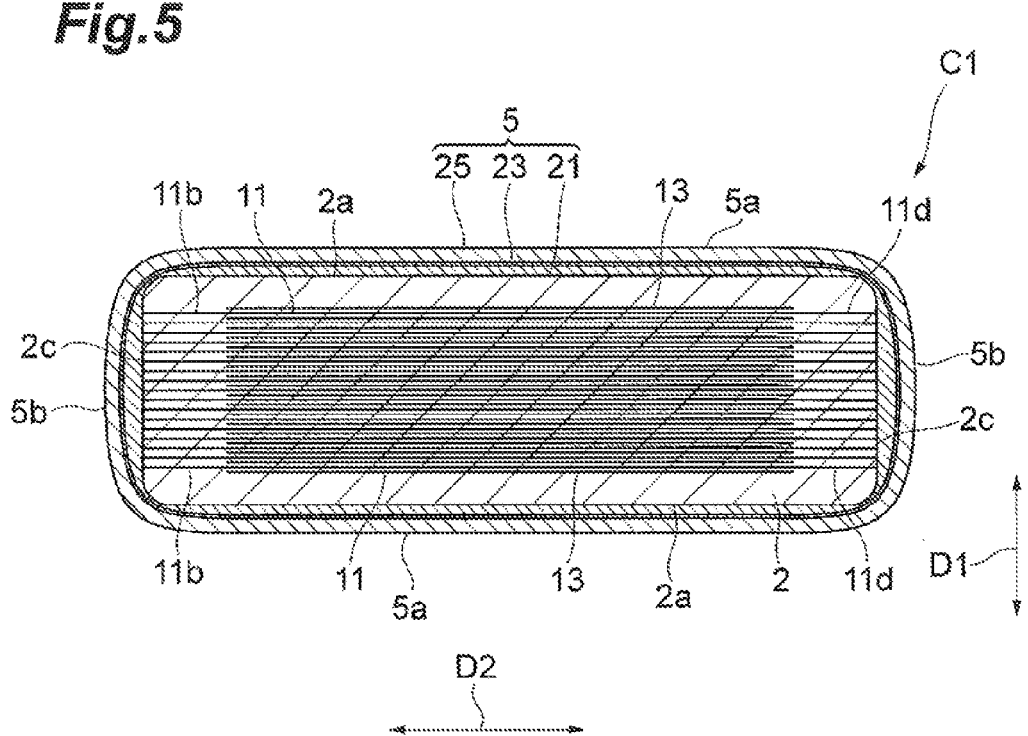
FIG. 5 is a drawing for explaining a cross-sectional configuration along the line V-V in FIG. 2.
Figure 6:
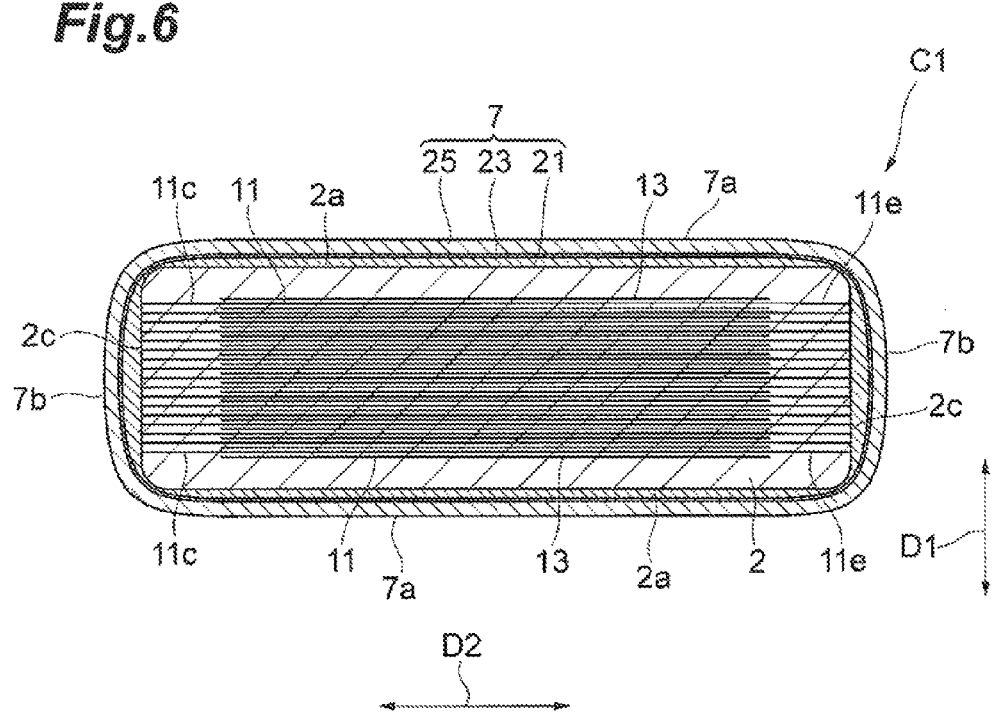
FIG. 6 is a drawing for explaining a cross-sectional configuration along the line VI-VI in FIG. 2.
Figure 7:
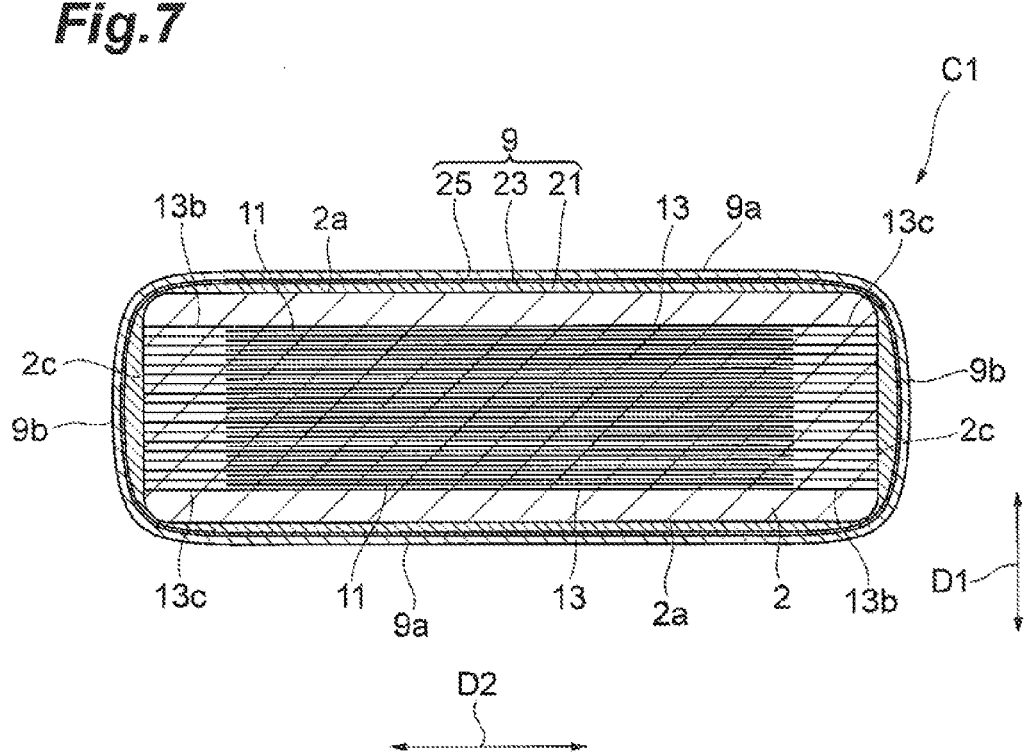
FIG. 7 is a drawing for explaining a cross-sectional configuration along the line VII-VII in FIG. 2.

A configuration of a multilayer feedthrough capacitor C1 according to the present embodiment will be described with reference to FIGS. 1 to 7. FIG. 1 is a perspective view showing the multilayer feedthrough capacitor according to the present embodiment. FIG. 2 is a plan view showing the multilayer feedthrough capacitor according to the present embodiment. FIG. 3 is a side view showing the multilayer feedthrough capacitor according to the present embodiment. FIG. 4 is a drawing for explaining a cross-sectional configuration along the line IV-IV in FIG. 2. FIG. 5 is a drawing for explaining a cross-sectional configuration along the line V-V in FIG. 2. FIG. 6 is a drawing for explaining a cross-sectional configuration along the line VI-VI in FIG. 2. FIG. 7 is a drawing for explaining a cross-sectional configuration along the line VII-VII in FIG. 2.

The multilayer feedthrough capacitor C1, as shown in FIGS. 1 to 7, includes an element body 2 of a rectangular parallelepiped shape and, first and second terminal signal electrodes 5, 7 and a terminal ground electrode 9 disposed on an outer surface of the element body 2. The first and second terminal signal electrodes 5, 7 and the terminal ground electrode 9 are separated from each other. The rectangular parallelepiped shape embraces a shape of a rectangular parallelepiped with chamfered corners and ridgelines and a shape of a rectangular parallelepiped with rounded corners and ridgelines.

The element body 2 includes, as the outer surface, a pair of principal surfaces $2a$ of a substantially rectangular shape opposing each other, a pair of first side surfaces $2c$ opposing each other, and a pair of second side surfaces $2e$, $2f$ opposing each other. A direction in which the pair of principal surfaces $2a$ oppose is a first direction D1, a direction in which the pair of first side surfaces $2c$ oppose is a second direction D2, and a direction in which the pair of second side surfaces $2e$, $2f$ oppose is a third direction D3. In the present embodiment, the first direction D1 is the height direction of the element body 2. The second direction D2 is the width direction of the element body 2 and is perpendicular to the first direction D1. The third direction D3 is the longitudinal direction of the element body 2 and is perpendicular to the first direction D1 and to the second direction D2.

The length in the first direction D1 of the element body 2 is smaller than The length in the third direction D3 of the element body 2 and smaller than The length in the second direction D2 of the element body 2. The length in the third direction D3 of the element body 2 is larger than the length in the second direction D2 of the element body 2. The length in the third direction D3 of the element body 2 is, for example, from 0.4 to 1.6 mm. The length in the second direction D2 of the element body 2 is, for example, from 0.2 to 0.8 mm. The length in the first direction D1 of the element body 2 is, for example, from 0.1 to 0.35 mm. The multilayer feedthrough capacitor C1 is an ultra-low-profile multilayer feedthrough capacitor. The length in the third direction D3 of the element body 2 may be equivalent to the length in the second direction D2 of the element body 2.

It is noted herein that the term "equivalent" does not always mean that values are exactly equal. The values may also be said to be equivalent in cases where the values have a slight difference within a predetermined range or include a manufacturing error or the like. For example, when a plurality of values fall within the range of ±5% of an average of the plurality of values, the plurality of values may be defined as equivalent.

The pair of first side surfaces $2c$ extend in the first direction D1 to connect the pair of principal surfaces $2a$. The pair of first side surfaces $2c$ also extend in the third direction D3 (the long-side direction of the pair of principal surfaces $2a$). The pair of second side surfaces $2e$, $2f$ extend in the first direction D1 to connect the pair of principal surfaces $2a$. The pair of second side surfaces $2e$, $2f$ also extend in the second direction D2 (the short-side direction of the pair of principal surfaces $2a$).

The element body 2 is constituted of a plurality of dielectric layers stacked in the direction in which the pair of principal surfaces $2a$ oppose (the first direction D1). In the element body 2, the direction in which the plurality of dielectric layers are stacked coincides with the first direction D1. For example, each dielectric layer includes a sintered body of a ceramic green sheet containing a dielectric material ($BaTiO_3$-based, $Ba(Ti, Zr)O_3$-based, $(Ba, Ca)TiO_3$-based, or other dielectric ceramic). In the element body 2 in practice, the dielectric layers are so integrated that no boundary can be visually recognized between the dielectric layers.

The multilayer feedthrough capacitor C1, as shown in FIGS. 4 to 7, includes a plurality of internal signal electrodes 11 and a plurality of internal ground electrodes 13. The internal signal electrodes 11 and internal ground electrodes 13 contain an electroconductive material (e.g., Ni or Cu or the like) that is commonly used as internal electrodes of multilayer electric elements. Each of the internal signal electrodes 11 and internal ground electrodes 13 includes a sintered body of an electroconductive paste containing the foregoing electroconductive material.

The internal signal electrodes 11 and the internal ground electrodes 13 are disposed at different positions (layers) in the height direction of the element body 2. The internal signal electrodes 11 and the internal ground electrodes 13 are alternately disposed to oppose with a space in between in the first direction D1, in the element body 2.

Each internal signal electrode 11, as shown in FIG. 8A, includes a main electrode portion 11a and a plurality of connection portions 11b, 11c, 11d, and 11e. Each of the connection portions 11b, 11 extends from one side (one long side) of the main electrode portion 11a and is exposed at one of the first side surfaces 2c. Each of the connection portions 11d, 11e extends from one side (the other long side) of the main electrode portion 11a and is exposed at the other of the first side surfaces 2c. Each internal signal electrode 11 is exposed at the pair of first side surfaces 2c but exposed neither at the pair of principal surfaces 2a nor at the pair of second side surfaces 2e, 2f. The main electrode portion 11a and the connection portions 11b, 11c, 11d, 11e are integrally formed.

The main electrode portion 11a is of a rectangular shape with the long sides along the third direction D3 and the short sides along the second direction D2. In the main electrode portion 11a of each internal signal electrode 11, the length thereof in the third direction D3 is larger than the length thereof in the second direction D2.

The connection portion 11b extends from a position closer to the second side surface 2e in the end on the one first side surface 2c side of the main electrode portion 11a, to the one first side surface 2c. An end of the connection portion 11b is exposed at the one first side surface 2c. The connection portion 11b is connected at its end exposed at the one first side surface 2c, to the first terminal signal electrode 5. The connection portion 11c extends from a position closer to the second side surface 2f in the end on the one first side surface 2c side of the main electrode portion 11a, to the one first side surface 2c. An end of the connection portion 11c is exposed at the one first side surface 2c. The connection portion 11c is connected at its end exposed at the one first side surface 2c, to the second terminal signal electrode 7.

The connection portion 11d extends from a position closer to the second side surface 2e in the end on the other first side surface 2c side of the main electrode portion 11a, to the other first side surface 2c. An end of the connection portion 11d is exposed at the other first side surface 2c. The connection portion 11d is connected at its end exposed at the other first side surface 2c, to the first terminal signal electrode 5. The connection portion 11e extends from a position closer to the second side surface 2f in the end on the other first side surface 2c side of the main electrode portion 11a, to the other first side surface 2c. An end of the connection portion 11e is exposed at the other first side surface 2c. The connection portion 11e is connected at its end exposed at the other first side surface 2c, to the second terminal signal electrode 7.

The lengths in the third direction D3 of the respective connection portions 11b, 11c, 11d, and 11e are smaller than the length in the third direction D3 of the main electrode portion 11a. The lengths in the third direction D3 of the respective connection portions 11b, 11c, 11d, and 11e are equivalent. The connection portion 11b and the connection portion 11c are located away in the third direction D3. The connection portion 11d and the connection portion 11e are located away in the third direction D3. The connection portion 11b and the connection portion 11d are located away in the second direction D2. The connection portion 11c and the connection portion 11e are located away in the second direction D2.

Each internal ground electrode 13, as shown in FIG. 8B, includes a main electrode portion 13a and a plurality of connection portions 13b, 13c. The main electrode portion 13a opposes the main electrode portion 11a through a part (dielectric layer) of the element body 2 in the first direction D1. The connection portion 13b extends from one side (one long side) of the main electrode portion 13a and is exposed at the one first side surface 2c. The connection portion 13c extends from one side (the other long side) of the main electrode portion 13a and is exposed at the other first side surface 2c. Each internal ground electrode 13 is exposed at the pair of first side surfaces 2c but exposed neither at the pair of principal surfaces 2a nor at the pair of second side surfaces 2e, 2f. The main electrode portion 13a and the connection portions 13b, 13c are integrally formed.

The main electrode portion 13a is of a rectangular shape with the long sides along the third direction D3 and the short sides along the second direction D2. In the main electrode portion 13a of each internal ground electrode 13, the length thereof in the third direction D3 is larger than the length thereof in the second direction D2. In the present embodiment, the length in the third direction D3 of the main electrode portion 11a and the length in the third direction D3 of the main electrode portion 13a are equivalent, and the length in the second direction D2 of the main electrode portion 11a and the length in the second direction D2 of the main electrode portion 13a are equivalent.

The connection portion 13b extends from a position in a central region in the third direction D3 in the end on the one first side surface 2c side of the main electrode portion 13a, to the one first side surface 2c. The connection portion 13c extends from a position in a central region in the third direction D3 in the end on the other first side surface 2c side of the main electrode portion 13a, to the other first side surface 2c. An end of the connection portion 13b is exposed at the one first side surface 2c. The connection portion 13b is connected at its end exposed at the one first side surface 2c, to the terminal ground electrode 9. An end of the connection portion 13c is exposed at the other first side surface 2c. The connection portion 13c is connected at its end exposed at the other first side surface 2c, to the terminal ground electrode 9.

The lengths in the third direction D3 of the respective connection portions 13b, 13c are smaller than the length in the third direction D3 of the main electrode portion 13a. The lengths in the third direction D3 of the respective connection portions 13b, 13c are equivalent. The connection portion 13b and the connection portion 13c are located away in the second direction D2. In the present embodiment, the lengths in the third direction D3 of the respective connection portions 11b, 11e, 11d, 11e and the lengths in the third direction D3 of the respective connection portions 13b, 13c are equivalent.

The first terminal signal electrode 5 includes electrode portions 5a disposed on the respective principal surfaces 2a and electrode portions 5b disposed on the respective first side surfaces 2c. The electrode portions 5a and the electrode portions 5b are connected at the ridgelines of the element body 2 to be electrically connected to each other. The electrode portion 5a disposed on one of the principal surfaces 2a and each of the electrode portions 5b disposed on the pair of first side surfaces 2c are connected at the ridgeline between the one principal surface 2a and each first side surface 2c. The electrode portion 5a disposed on the other of the principal surfaces 2a and each of the electrode portions 5b disposed on the pair of first side surfaces 2c are connected at the ridgeline between the other principal surface 2a and each first side surface 2c. The first terminal signal electrode 5 is formed on the four surfaces of the pair of principal surfaces 2a and the pair of first side surfaces 2c.

Each electrode portion 5a is of a substantially rectangular shape on the plan view. The electrode portion 5a is located in a region closer to the second side surface 2e with respect to a central region in the third direction D3, on each principal surface 2a. The electrode portion 5a is located on the second side surface 2e side of each principal surface 2a. The electrode portion 5a is formed to extend between the end closer to one of the first side surfaces 2c and the end closer to the other of the first side surfaces 2c, in the principal surface 2a. The length in the second direction D2 of the electrode portion 5a is equivalent to the length in the second direction D2 of the element body 2.

Each electrode portion 5b is located in a region closer to the second surface 2e with respect to a central region in the third direction D3, on each first side surface 2c. The electrode portion 5b is located on the second side surface 2e side of each first side surface 2c. The electrode portion 5b is of a substantially rectangular shape on the plan view. The electrode portion 5b is disposed to cover all exposed portions of the respective connection portions 11b or 11d at the corresponding first side surface 2c. Each of the connection portions 11b, 11d is directly connected to the first terminal signal electrode 5. Each connection portion 11b or 11d connects the main electrode portion 11a to the electrode portion 5b. Each internal signal electrode 11 is electrically connected to the first terminal signal electrode 5. The length in the third direction D3 of the electrode portions 5a and the length in the third direction D3 of the electrode portions 5b are equivalent.

The second terminal signal electrode 7 includes electrode portions 7a disposed on the respective principal surfaces 2a and electrode portions 7b disposed on the respective first side surfaces 2c. The electrode portions 7a and the electrode portions 7b are connected at the ridgelines of the element body 2 to be electrically connected to each other. The electrode portion 7a disposed on one of the principal surfaces 2a and each of the electrode portions 7b disposed on the pair of first side surfaces 2c are connected at the ridgeline between the one principal surface 2a and each first side surface 2c. The electrode portion 7a disposed on the other of the principal surfaces 2a and each of the electrode portions 7b disposed on the pair of first side surfaces 2c are connected at the ridgeline between the other principal surface 2a and each first side surface 2c. The second terminal signal electrode 7 is formed on the four surfaces of the pair of principal surfaces 2a and the pair of first side surfaces 2c.

Each electrode portion 7a is of a substantially rectangular shape on the plan view. The electrode portion 7a is located in a region closer to the second surface 2f with respect to a central region in the third direction D3, on each principal surface 2a. The electrode portion 7a is located on the second side surface 2f side of each principal surface 2a. The electrode portion 7a is formed to extend between the end closer to the one first side surface 2c and the end closer to the other first side surface 2c, in the principal surface 2a. The length in the second direction D2 of the electrode portion 7a is equivalent to the length in the second direction D2 of the element body 2.

The electrode portion 7b is located in a region closer to the second surface 2f with respect to a central region in the third direction D3, on each first side surface 2c. The electrode portion 7b is located on the second side surface 2f side of each first side surface 2c. The electrode portion 7b is of a substantially rectangular shape on the plan view. The electrode portion 7b is disposed to cover all exposed portions of the respective connection portions 11c or 11e at the corresponding first side surface 2c. Each of the connection portions 11c, 11e is directly connected to the second terminal signal electrode 7. Each connection portion 11c or 11e connects the main electrode portion 11a to the electrode portion 7b. Each internal signal electrode 11 is electrically connected to the second terminal signal electrode 7. The length in the third direction D3 of the electrode portions 7a and the length in the third direction D3 of the electrode portions 7b are equivalent. In the present embodiment, the length in the third direction D3 of the electrode portions 5a, 5b and the length in the third direction D3 of the electrode portions 7a, 7b are equivalent.

The terminal ground electrode 9 includes electrode portions 9a disposed on the respective principal surfaces 2a and electrode portions 9b disposed on the respective first side surfaces 2c. The electrode portions 9a and the electrode portions 9b are connected at the ridgelines of the element body 2 to be electrically connected to each other. The electrode portion 9a disposed on one of the principal surfaces 2a and each of the electrode portions 9b disposed on the pair of first side surfaces 2c are connected at the ridgeline between the one principal surface 2a and each first side surface 2c. The electrode portion 9a disposed on the other of the principal surfaces 2a and each of the electrode portions 9b disposed on the pair of first side surfaces 2c are connected at the ridgeline between the other principal surface 2a and each first side surface 2c. The terminal ground electrode 9 is formed on the four surfaces of the pair of principal surfaces 2a and the pair of first side surfaces 2c.

Each electrode portion 9a is of a substantially rectangular shape on the plan view. The electrode portion 9a is located in the central region in the third direction D3, on each principal surface 2a. The electrode portion 9a is formed to extend between the end closer to one of the first side surfaces 2c and the end closer to the other of the first side surfaces 2c, in the principal surface 2a. The length in the second direction D2 of the electrode portion 9a is equivalent to the length in the second direction D2 of the element body 2.

The electrode portion 9b is located in the central region in the third direction D3, on each first side surface 2c. Each electrode portion 9b is of a substantially rectangular shape on the plan view. The electrode portion 9b is disposed to cover all exposed portions of the respective connection portions 13b or 13c at the corresponding first side surface 2c. Each of the connection portions 13b, 13c is directly connected to the terminal ground electrode 9. Each connection portion 13b or 13c connects the main electrode portion 13a to the electrode portion 9b. Each internal ground electrode 13 is electrically connected to the terminal ground electrode 9. The length in the third direction D3 of the electrode portions 9a and the length in the third direction D3 of the electrode portions 9b are equivalent.

The terminal ground electrode 9 is located between the first terminal signal electrode 5 and the second terminal signal electrode 7 in the third direction D3. The first terminal signal electrode 5 is disposed at one end in the third direction D3 of the element body 2. The second terminal signal electrode 7 is disposed at the other end in the third direction D3 of the element body 2.

The electrode portions 5a of the first terminal signal electrode 5, the electrode portions 7a of the second terminal signal electrode 7, and the electrode portions 9a of the terminal ground electrode 9 are separated in the third direction D3. The electrode portions 5a, 7a, and 9a are disposed in an order of the electrode portions 5a, the electrode portions 9a, and the electrode portions 7a in the direction from the second side surface 2e to the second side surface 2f on the principal surfaces 2a. The electrode portions 5a, 7a, and 9a are located alongside in the third direction D3 on the principal surfaces 2a.

The electrode portions 5b of the first terminal signal electrode 5, the electrode portions 7b of the second terminal signal electrode 7, and the electrode portions 9b of the terminal ground electrode 9 are separated in the third direction D3. The electrode portions 5b, 7b, and 9b are disposed in an order of the electrode portions 5b, the electrode portions 9b, and the electrode portions 7b in the direction from the second side surface 2e to the second side surface 2f, on the first side surfaces 2c. The electrode portions 5b, 7b, and 9b are located alongside in the third direction D3 on the first side surfaces 2c.

The terminal electrodes 5, 7, 9 are not disposed on the pair of second side surfaces 2e, 2f of the element body 2. Namely, the first and second terminal signal electrodes 5, 7 include no electrode portion disposed on either of the second side surfaces 2e, 2f. For this reason, the pair of second side surfaces 2e, 2f of the element body 2 are exposed.

Each of the first and second terminal signal electrodes 5, 7 and the terminal ground electrode 9 includes a first electrode layer 21, a second electrode layer 23, and a third electrode layer 25. Each of the electrode portions 5a, 5b, the electrode portions 7a, 7b, and the electrode portions 9a, 9b includes the first electrode layer 21, second electrode layer 23, and third electrode layer 25. The third electrode layer 25 constitutes the outermost layer of each of the first and second terminal signal electrodes 5, 7 and the terminal ground electrode 9. In the present embodiment, each of the first and second terminal signal electrodes 5, 7 and the terminal ground electrode 9 is composed of the first electrode layer 21, the second electrode layer 23, and the third electrode layer 25.

The first electrode layer 21 is formed by applying an electroconductive paste onto the surface of the element body 2 and sintering it. The first electrode layer 21 is a sintered conductor layer (sintered metal layer). In the present embodiment, the first electrode layer 21 is a sintered conductor layer made of Cu. The first electrode layer 21 may be a sintered conductor layer made of Ni. The first electrode layer 21 contains Cu or Ni. For example, the electroconductive paste is obtained by mixing a powder made of Cu or Ni, a glass component, an organic binder, and an organic solvent. The thickness of the first electrode layer 21 is, for example, 20 μm at a maximum.

The second electrode layer 23 is formed by plating on the first electrode layer 21. In the present embodiment, the second electrode layer 23 is an Ni-plated layer formed by Ni plating on the first electrode layer 21. The second electrode layer 23 may be an Sn-plated layer. The second electrode layer 23 contains Ni or Sn. The thickness of the second electrode layer 23 is, for example, from 1 to 5 μm.

The third electrode layer 25 is formed by plating on the second electrode layer 23. In the present embodiment, the third electrode layer 25 is a Cu-plated layer formed by Cu plating on the second electrode layer 23. The third electrode layer 25 may be an Au-plated layer. The third electrode layer 25 contains Cu or Au. The thickness of the third electrode layer 25 is, for example, from 1 to 15 μm.

Figure 9:
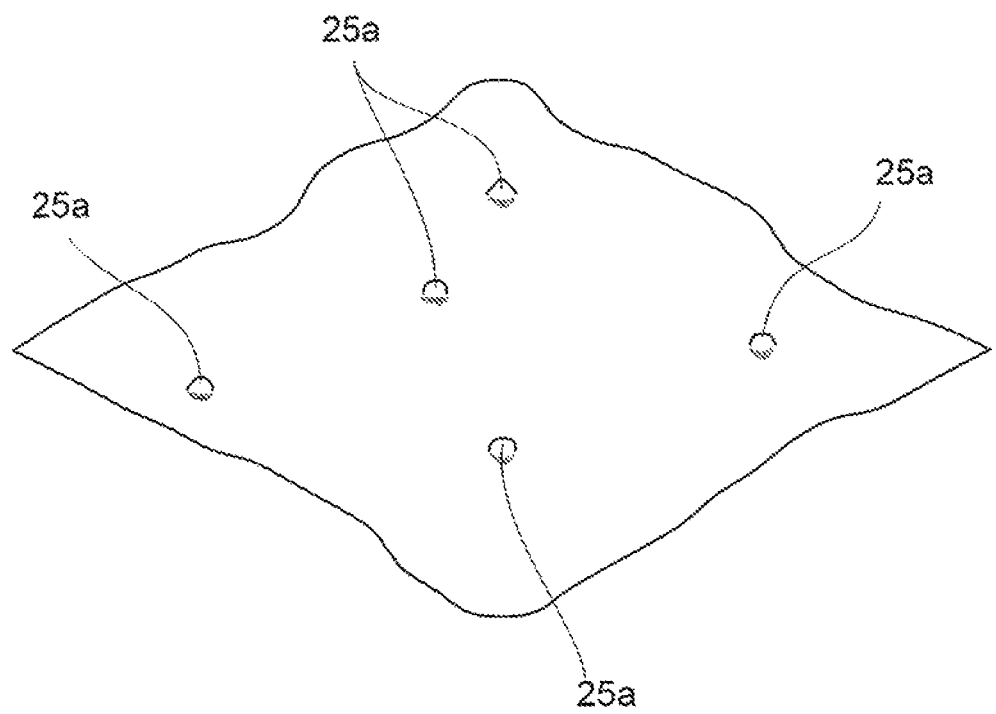
FIG. 9 is a perspective view showing a third electrode layer.

A plurality of projections 25a may be formed on the surface of the third electrode layer 25 being the Cu-plated layer, as also shown in FIG. 9. In this case, each projection 25a is made of Cu. The diameter of each projection 25a is from 10 to 30 μm and the height of each projection 25a from 1 to 10 μm.

Figure 10:
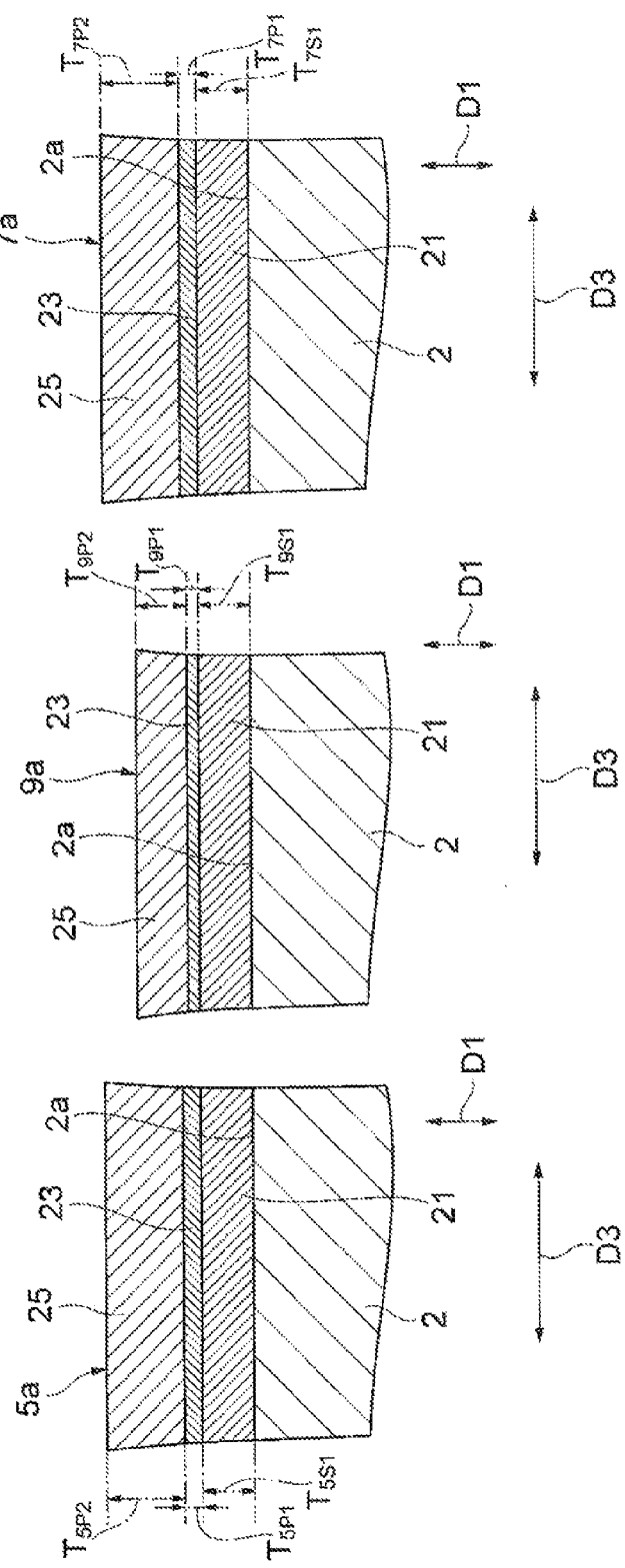
FIG. 10A is a drawing for explaining a cross-sectional configuration of an electrode portion of a first terminal signal electrode, FIG. 10B a drawing for explaining a cross-sectional configuration of an electrode portion of a second terminal signal electrode, and FIG. 10C a drawing for explaining a cross-sectional configuration of an electrode portion of a terminal ground electrode.
Figure 11:
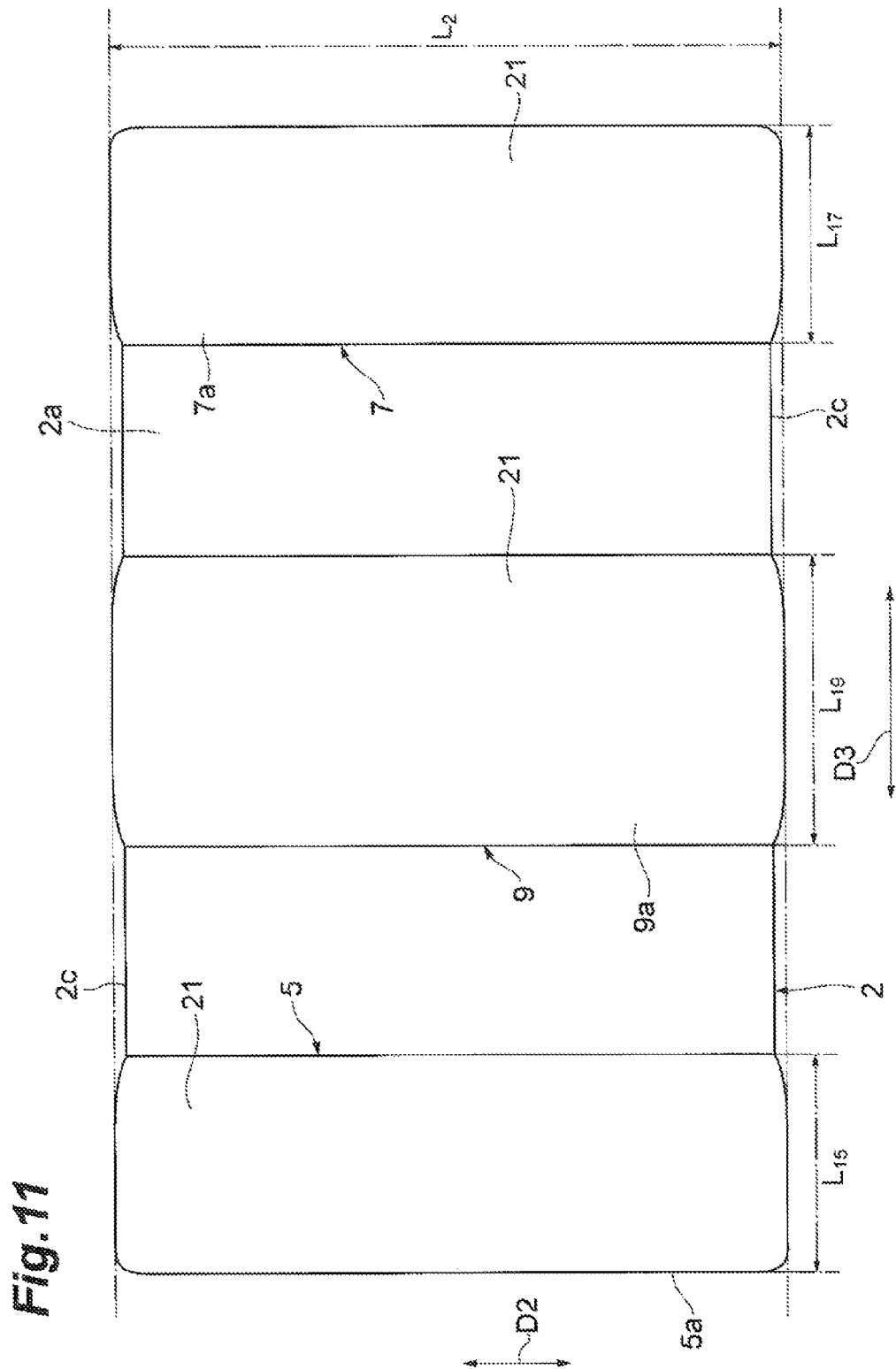
FIG. 11 is a plan view of an element body on which first electrode layers are formed.
Figure 12:
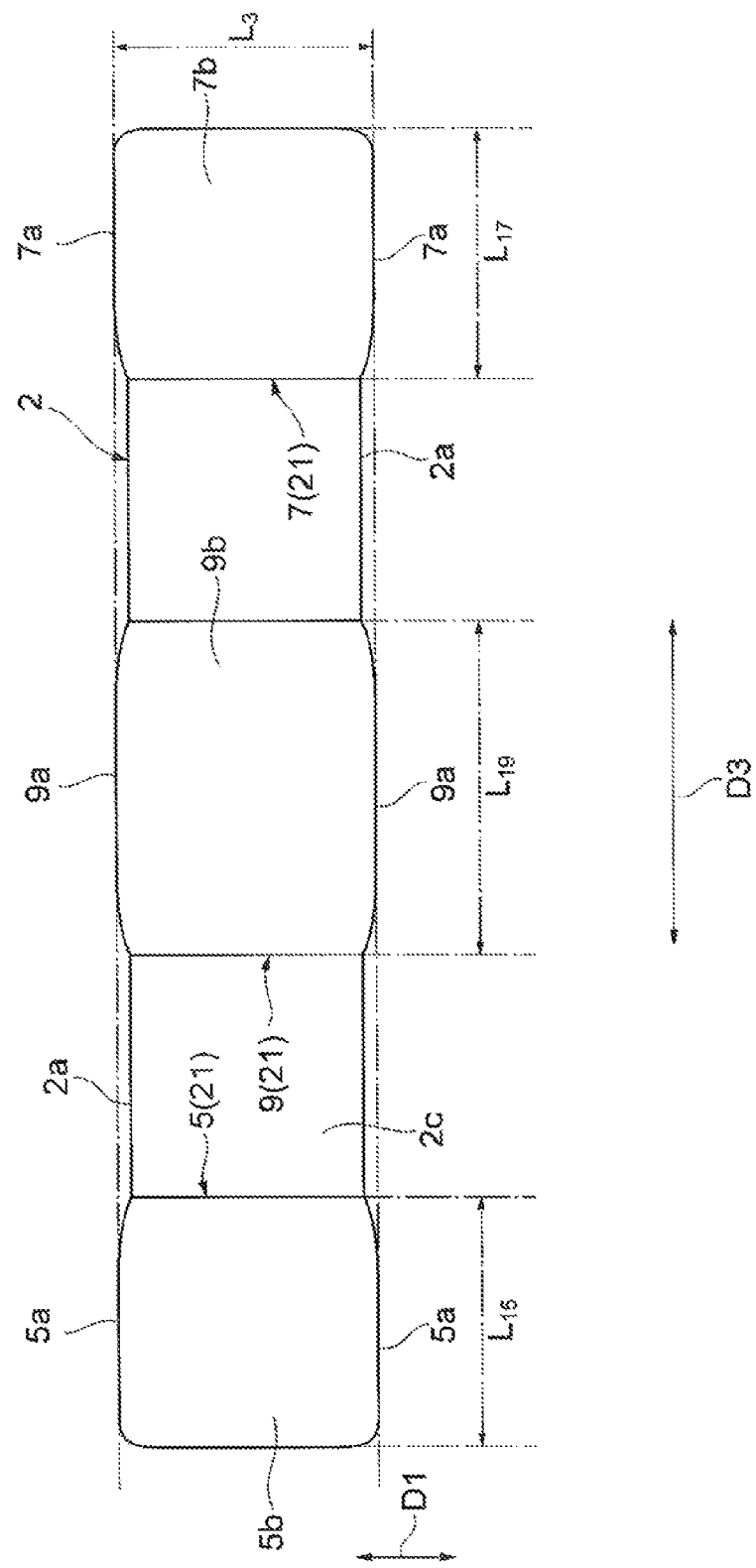
FIG. 12 is a side view of the element body on which the first electrode layers are formed.

Next, the thicknesses of the respective electrode portions 5a, 7a, 9a of the first and second terminal signal electrodes 5, 7 and the terminal ground electrode 9 will be described with reference to FIGS. 10A, 10B, and 10C.

The thickness $T_{9S1}$ of the first electrode layer 21 of the electrode portion 9a is not more than the thickness $T_{5S1}$ of the first electrode layer 21 of the electrode portion 5a and not more than the thickness $T_{7S1}$ of the first electrode layer 21 of the electrode portion 7a. In the present embodiment, the thickness $T_{5S1}$, the thickness $T_{7S1}$, and the thickness $T_{9S1}$ are equivalent.

The thickness $T_{5P1}$ of the second electrode layer 23 of the electrode portion 5a is equivalent to the thickness $T_{7P1}$ of the second electrode layer 23 of the electrode portion 7a. The thickness $T_{9P1}$ of the second electrode layer 23 of the electrode portion 9a is smaller than the thickness $T_{5P1}$ and smaller than the thickness $T_{7P1}$. The thickness $T_{5P2}$ of the third electrode layer 25 of the electrode portion 5a is equivalent to the thickness $T_{7P2}$ of the third electrode layer 25 of the electrode portion 7a. The thickness $T_{9P2}$ of the third electrode layer 25 of the electrode portion 9a is smaller than the thickness $T_{5P2}$ and smaller than the thickness $T_{7P2}$. The thickness $(T_{9P1}+T_{9P2})$ of the plated layers of the electrode portion 9a is smaller than the thickness $(T_{5P1}+T_{5P2})$ of the plated layers of the electrode portion 5a and smaller than the thickness $(T_{7P1}+T_{7P2})$ of the plated layers of the electrode portion 7a.

The thickness $(T_{9S1}+T_{9P1}+T_{9P2})$ of the electrode portion 9a is smaller than the thickness $(T_{5S1}+T_{5P1}+T_{5P2})$ of the electrode portion 5a and smaller than the thickness $(T_{7S1}+T_{7P1}+T_{7P2})$ of the electrode portion 7a. In the present embodiment, the thickness $(T_{9S1}+T_{9P1}+T_{9P2})$ of the electrode portion 9a is not more than 90% of the thickness $(T_{5S1}+T_{5P1}+T_{5P2})$ of the electrode portion 5a and not more than 90% of the thickness $(T_{7S1}+T_{7P1}+T_{7P2})$ of the electrode portion 7a. Each of the thicknesses $T_{5S1}$, $T_{7S1}$, and $T_{9S1}$ is, for example, 10 μm. Each of the thicknesses $T_{5P1}$, $T_{7P1}$ is, for example, 4 μm. The thickness $T_{9P1}$ is, for example, 3 μm. Each of the thicknesses $T_{5P2}$, $T_{7P2}$ is, for example, 10 μm. The thickness $T_{9P2}$ is, for example, 7.5 μm.

Next, the areas of the first electrode layers 21 of the first and second terminal signal electrodes 5, 7 and the terminal ground electrode 9 will be described with reference to FIGS. 2, 3, 11, and 12.

The length $L_{15}$ in the third direction D3 of the first electrode layer 21 of each electrode portion 5a, 5b, the length $L_{17}$ in the third direction D3 of the first electrode layer 21 of each electrode portion 7a, 7b, and the length $L_{19}$ in the third direction D3 of the first electrode layer 21 of each electrode portion 9a, 9b are equivalent. The length $L_{19}$ is smaller than a total value of the length $L_{15}$ and the length $L_{17}$. The length $L_2$ in the second direction D2 of the first electrode layer 21 of the electrode portion 5a, the length $L_2$ in the second direction D2 of the first electrode layer 21 of the electrode portion 7a, and the length $L_2$ in the second direction D2 of the first electrode layer 21 of the electrode portion 9a are equivalent. The length $L_3$ in the first direction D1 of the first electrode layer 21 of the electrode portion 5b, the length $L_3$ in the first direction D1 of the first electrode layer 21 of the electrode portion 7b, and the length $L_3$ in the first direction D1 of the first electrode layer 21 of the electrode portion 9b are equivalent.

The area of the first electrode layer 21 of the first terminal signal electrode 5 is a total value of the areas of the first electrode layers 21 of the pair of electrode portions 5a and the pair of electrode portions 5b. The area of the first electrode layer 21 of the first terminal signal electrode 5 is expressed approximately as "$2 \times L_{15} \times (L_2 + L_3)$."

The area of the first electrode layer 21 of the second terminal signal electrode 7 is a total value of the areas of the first electrode layers 21 of the pair of electrode portions 7a and the pair of electrode portions 7b. The area of the first electrode layer 21 of the second terminal signal electrode 7 is expressed approximately as "$2 \times L_{17} \times (L_2 + L_3)$."

The area of the first electrode layer 21 of the terminal ground electrode 9 is a total value of the areas of the first electrode layers 21 of the pair of electrode portions 9a and the pair of electrode portions 9b. The area of the first electrode layer 21 of the terminal ground electrode 9 is expressed approximately as "$2 \times L_{19} \times (L_2 + L_3)$."

In the present embodiment, the area of the first electrode layer 21 of the first terminal signal electrode 5, the area of the first electrode layer 21 of the second terminal signal electrode 7, and the area of the first electrode layer 21 of the terminal ground electrode 9 are equivalent.

In the present embodiment, as described above, the length in the first direction D1 of the element body 2 is smaller than the length in the second direction D2 of the element body 2 and smaller than the length in the third direction D3 of the element body 2. For this reason, the multilayer feedthrough capacitor C1 is obtained that has reduced height and the multilayer feedthrough capacitor C1 is realized that is suitable for built-in mounting in a substrate. The first and second terminal signal electrodes 5, 7 and the terminal ground electrode 9 include their respective electrode portions 5a, 7a, 9a disposed on the pair of principal surfaces 2a. The multilayer feedthrough capacitor C1 can be electrically connected to wiring formed on the substrate, on the one principal surface 2a side of the element body 2, on the other principal surface 2a side of the element body 2, or, on both of the principal surface 2a sides of the element body 2. Therefore, the multilayer feedthrough capacitor C1 can be readily built into the substrate.

In a process of mounting the multilayer feedthrough capacitor C1 on the substrate, a space around the multilayer feedthrough capacitor C1 is filled with a resin. The terminal ground electrode 9 is located between the first terminal signal electrode 5 and the second terminal signal electrode 7 in the third direction D3. If the thickness of the electrode portion 9a of the terminal ground electrode 9 is equivalent to the thickness of the electrode portion 5a of the first terminal signal electrode 5 and equivalent to the thickness of the electrode portion 7a of the second terminal signal electrode 7, the electrode portion 9a will be located on a virtual plane VP being parallel to the principal surface 2a of the element body 2 and including the surfaces of the electrode portions 5a, 7a. In this case, there will be no sufficient space formed for the resin to flow in, around the terminal ground electrode 9 and, for this reason, in a process of filling the space around the multilayer feedthrough capacitor C1 with the resin, the resin is less likely to flow to around the terminal ground electrode 9. It can result in failing to fully fill the space around the terminal ground electrode 9 with the resin and generating an air gap. As a result, there is a possibility of failing to suitably build the multilayer feedthrough capacitor C1 into the substrate.

In the present embodiment, the thickness of the electrode portion 9a is smaller than the thicknesses of the electrode portions 5a, 7a, and thus the electrode portion 9a is located away from the virtual plane VP. Since a space is formed for the resin to flow in, around the terminal ground electrode 9, the resin is likely to flow to around the terminal ground electrode 9, in the process of filling the space around the multilayer feedthrough capacitor C1 with the resin. The generation of the air gap around the terminal ground electrode 9 is suppressed in the process of filling the space around the multilayer feedthrough capacitor C1 with the resin. As a result, it is feasible to suitably build the multilayer feedthrough capacitor C1 into the substrate.

The thickness of the electrode portion 9a is not more than 90% of the thicknesses of the respective electrode portions 5a, 7a. Since this makes it much easier for the resin to flow to around the terminal ground electrode 9, the generation of the air gap around the terminal ground electrode 9 can be suppressed with certainty. The thickness of the electrode portion 9a may be not less than 80% of the thicknesses of the respective electrode portions 5a, 7a. If the thickness of the electrode portion 9a is less than 80% of the thicknesses of the respective electrode portions 5a, 7a, a connection area of the terminal ground electrode 9 with a via conductor will become smaller than connection areas of the first and second terminal signal electrodes 5, 7 with via conductors, which could cause degradation of connection reliability between the terminal ground electrode 9 and via conductor.

A plated layer of an electronic component is generally formed on a sintered conductor layer by a barrel plating method. The barrel plating method is performed using electroconductive media. The media are brought into contact with the sintered conductor layer, whereby an electric current flows through the sintered conductor layer, so as to deposit the plated layer on the sintered conductor layer.

When the area of the first electrode layer 21 being the sintered conductor layer is large, a contact probability of the media is higher than when the area of the first electrode layer 21 is small. For this reason, the thickness of the plated layer formed on the first electrode layer 21 having the large area is larger than the thickness of the plated layer (the second and third electrode layers 23, 25) formed on the first electrode layer 21 having the small area. If the areas of the respective first electrode layers 21 are equivalent, the thicknesses of the plated layers formed on the respective first electrode layers 21 will be equivalent.

The first terminal signal electrode 5 and the second terminal signal electrode 7 are electrically connected through the internal signal electrodes 11. Since the area of the first electrode layer 21 of the terminal ground electrode 9 is smaller than the total value of the area of the first electrode layer 21 of the first terminal signal electrode 5 and the area of the first electrode layer 21 of the second terminal signal electrode 7, the thickness of the plated layer (the second and third electrode layers 23, 25) formed on the first electrode layer 21 of the electrode portion 9a is smaller than the thicknesses of the respective plated layers (the second and third electrode layers 23, 25) formed on the first electrode layers 21 of the electrode portions 5a, 7a. The thickness $T_{9S1}$ of the first electrode layer 21 of the electrode portion 9a is not more than the thicknesses $T_{5S1}$, $T_{7S1}$ of the respective electrode layers 21 of the electrode portions 5a, 7a.

Because of these, the thickness ($T_{9S1} + T_{9P1} + T_{9P2}$) of the electrode portion 9a is smaller than the thickness ($T_{5S1} +$ $T_{5P1}+T_{5P2}$) of the electrode portion 5a and smaller than the thickness ($T_{7S1}+T_{7P1}+T_{7P2}$) of the electrode portion 7a. As the areas of the respective terminal electrodes 5, 7, 9 and the thicknesses of the respective first electrode layers 21 are set in the above-described relationships, the thickness of the electrode portion 9a can be readily made smaller than the thicknesses of the respective electrode portions 5a, 7a.

The plated layers are formed on the first electrode layers 21. In the case where the area of the first electrode layer 21 of the terminal ground electrode 9 is smaller than the total value of the area of the first electrode layer 21 of the first terminal signal electrode 5 and the area of the first electrode layer 21 of the second terminal signal electrode 7, the area of the plated layer of the terminal ground electrode 9 is basically also smaller than the total value of the area of the plated layer of the first terminal signal electrode 5 and the area of the plated layer of the second terminal signal electrode 7. For this reason, when the area of the first electrode layer 21 of the terminal ground electrode 9 is smaller than the total value of the area of the first electrode layer 21 of the first terminal signal electrode 5 and the area of the first electrode layer 21 of the second terminal signal electrode 7, the area of the terminal ground electrode 9 is smaller than the total value of the area of the first terminal signal electrode 5 and the area of the second terminal signal electrode 7.

When a plated layer (e.g., the second electrode layer 23) is formed on an underlying layer (e.g., the first electrode layer 21), there is a possibility of occurrence of a phenomenon that the plated layer is formed not only on the surface of the underlying layer but also on the surface of the element body 2 (which is so called "plating elongation"). In the present embodiment (including below-described modification examples), the plated layer located on the surface of the element body 2 is not added to the area of each terminal electrode (plated layer).

In the present embodiment, each of the first and second terminal signal electrodes 5, 7 and the terminal ground electrode 9 includes the first electrode layer 21, second electrode layer 23, and third electrode layer 25. Since the internal signal electrodes 11 and the internal ground electrodes 13 are connected to the first electrode layers 21 being the sintered conductor layers, the internal signal electrodes 11 and the internal ground electrodes 13 are kept in secure contact with the first electrode layers 21. Since the third electrode layers 25 contain Cu or Au, it is feasible to further ensure connectivity between the wiring formed on the substrate and the first and second terminal signal electrodes 5, 7 and terminal ground electrode 9. The second electrode layers 23 prevent the first electrode layers 21 from being damaged in a process of forming the third electrode layers 25 thereon. For this reason, it is feasible to suppress degradation of insulation resistance of the multilayer feedthrough capacitor C1.

As described below, the multilayer feedthrough capacitor C1 is disposed in a housing portion of a substrate and thereafter the housing portion is filled with a resin, whereby the multilayer feedthrough capacitor C1 is built into the substrate. In the case where the projections 25a are formed on the surface of the third electrode layer 25 being a Cu-plated layer, the projections 25a form unevenness on the surface of the third electrode layer 25. The configuration wherein the projections 25a are formed on the third electrode layer 25 offers a larger surface area of the third electrode layer 25 and better engagement between the third electrode layer 25 and the resin because of the foregoing unevenness, compared to a configuration without the projections 25a. Therefore, this configuration can improve adhesion between the third electrode layer 25 and resin when the multilayer feedthrough capacitor C1 is built into the substrate.

The terminal ground electrode 9 is located between the first terminal signal electrode 5 and the second terminal signal electrode 7 in the third direction D3. The first and second terminal signal electrodes 5, 7 and the terminal ground electrode 9 include their respective electrode portions 5b, 7b, and 9b disposed on the first side surfaces 2c. Each internal signal electrode 11 includes the connection portions 11b, 11d connected to the electrode portions 5b and the connection portions 11c, 11e connected to the electrode portions 7b. The connection portions 11b, 11c, 11d, 11e are exposed at the corresponding first side surfaces 2c. Each internal ground electrode 13 includes the connection portions 13b, 13c connected to the electrode portions 9b. The connection portions 13b, 13c are exposed at the corresponding first side surfaces 2c. Since the first and second terminal signal electrodes 5, 7 and the terminal ground electrode 9 include their respective electrode portions 5b, 7b, 9b disposed on the same first side surfaces 2c, the first and second terminal signal electrodes 5, 7 and the terminal ground electrode 9 are disposed in a state in which they are close to each other. This makes electric current paths shorter in the multilayer feedthrough capacitor C1, thereby achieving a reduction in ESL.

The electrode portions 5a, 7a, 9a and the electrode portions 5b, 7b, 9b are connected at the ridgelines of the element body 2. In the multilayer feedthrough capacitor C1, electric current paths are formed from the pair of first side surface 2c sides. The multilayer feedthrough capacitor C1 where the electric current paths are formed from the pair of first side surface 2c sides has a larger number of electric current paths than a multilayer feedthrough capacitor where electric current paths are formed from only one first side surface 2c side, and thus the multilayer feedthrough capacitor C1 can achieve reductions in ESL and ESR.

The first and second terminal signal electrodes 5, 7 are disposed at the ends in the third direction D3 of the element body 2 and the first and second terminal signal electrodes 5, 7 include no electrode portion disposed on either of the second side surfaces 2e, 2f. In the case where the first and second terminal signal electrodes 5, 7 include no electrode portion disposed on either of the second side surfaces 2e, 2f, the areas of the electrode portions 5a, 5b, 7a, 7b can be set larger than in a case where the first and second terminal signal electrodes 5, 7 include electrode portions disposed on the second side surfaces 2e, 2f. For this reason, it is feasible to enhance connectivity between the first and second terminal signal electrodes 5, 7 and the wiring formed on the substrate.

Figure 13:
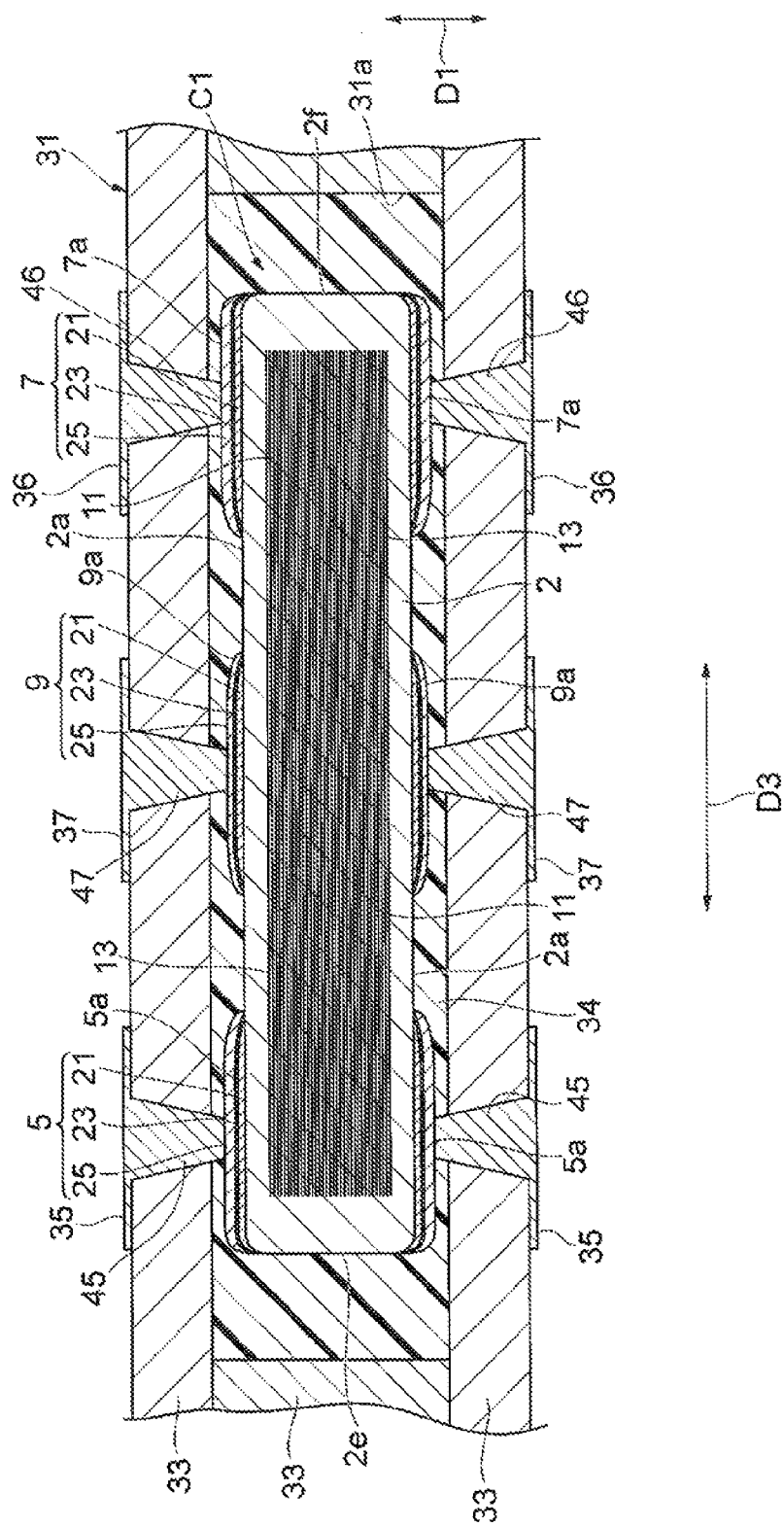
FIG. 13 is a drawing for explaining a mounted structure of the multilayer feedthrough capacitor according to the embodiment.

The multilayer feedthrough capacitor C1, as shown in FIG. 13, is mounted as embedded in a substrate 31. Namely, the multilayer feedthrough capacitor C1 is built into the substrate 31. FIG. 13 is a drawing for explaining a mounted structure of the multilayer feedthrough capacitor according to the present embodiment.

The substrate 31 is constructed by stacking a plurality of insulating layers 33. The insulating layers 33 are made of an insulating material such as ceramic or resin and are integrated with each other by adhesion or the like.

The multilayer feedthrough capacitor C1 is disposed in a housing portion 31a formed in the substrate 31. The multilayer feedthrough capacitor C1 is fixed to the substrate 31 by resin 34 filled in the housing portion 31a. The multilayer feedthrough capacitor C1 is embedded in the substrate 31.

The multilayer feedthrough capacitor C1 is electrically connected through via conductors 45-47 to electrodes 35-37 disposed on the surface of the substrate 31.

Each electrode portion 5a of the first terminal signal electrode 5 is connected to the via conductor 45. The first terminal signal electrode 5 is electrically connected through the via conductors 45 to the electrode 35. Each electrode portion 7a of the second terminal signal electrode 7 is connected to the via conductor 46. The second terminal signal electrode 7 is electrically connected through the via conductors 46 to the electrode 36. Each electrode portion 9a of the terminal ground electrode 9 is connected to the via conductor 47. The terminal ground electrode 5 is electrically connected through the via conductors 47 to the electrode 37.

The via conductors 45-47 are formed by growing an electroconductive metal (e.g., Cu or the like) in via holes formed in the substrate 31. The growth of the electroconductive metal is realized, for example, by electroless plating. The via holes are formed to reach the electrode portions 5a, 7a, 9a of the first and second terminal signal electrodes 5, 7 and the terminal ground electrode 9 of the multilayer feedthrough capacitor C1 from the surface side of the substrate 31. The via holes are formed, for example, by laser processing.

In the multilayer feedthrough capacitor C1, the electrode portions 5a, 7a, 9a include the third electrode layers 25 as plated layers. Therefore, the electrode portions 5a, 7a, 9a can be securely connected to the via conductors 45-47 formed in the via holes. When the via conductors 45-47 are formed by plating, the via conductors 45-47 are more securely connected to the electrode portions 5a, 7a, 9a.

Figure 14:
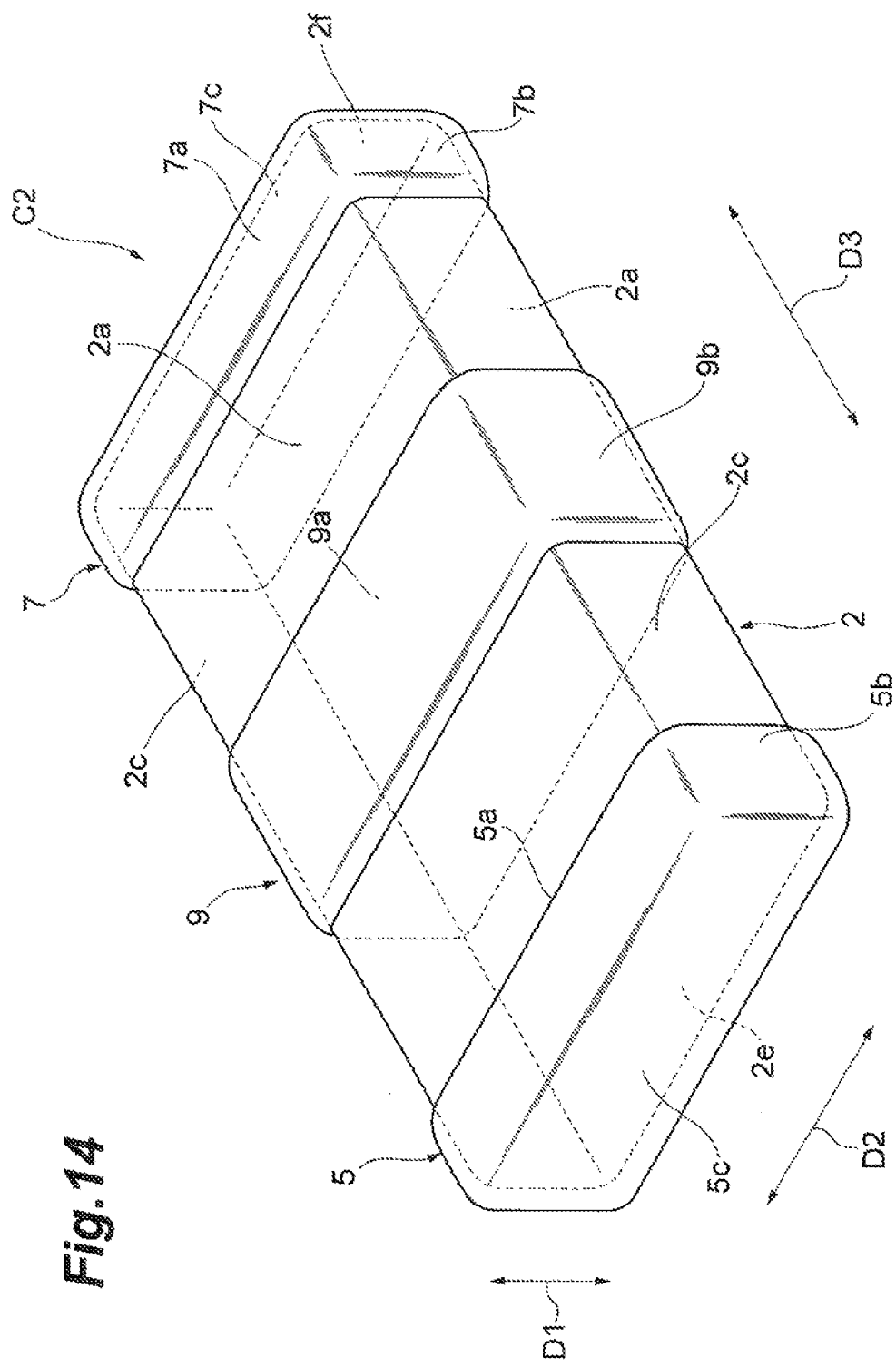
FIG. 14 is a perspective view showing a multilayer feedthrough capacitor according to a modification example of the embodiment.
Figure 15:
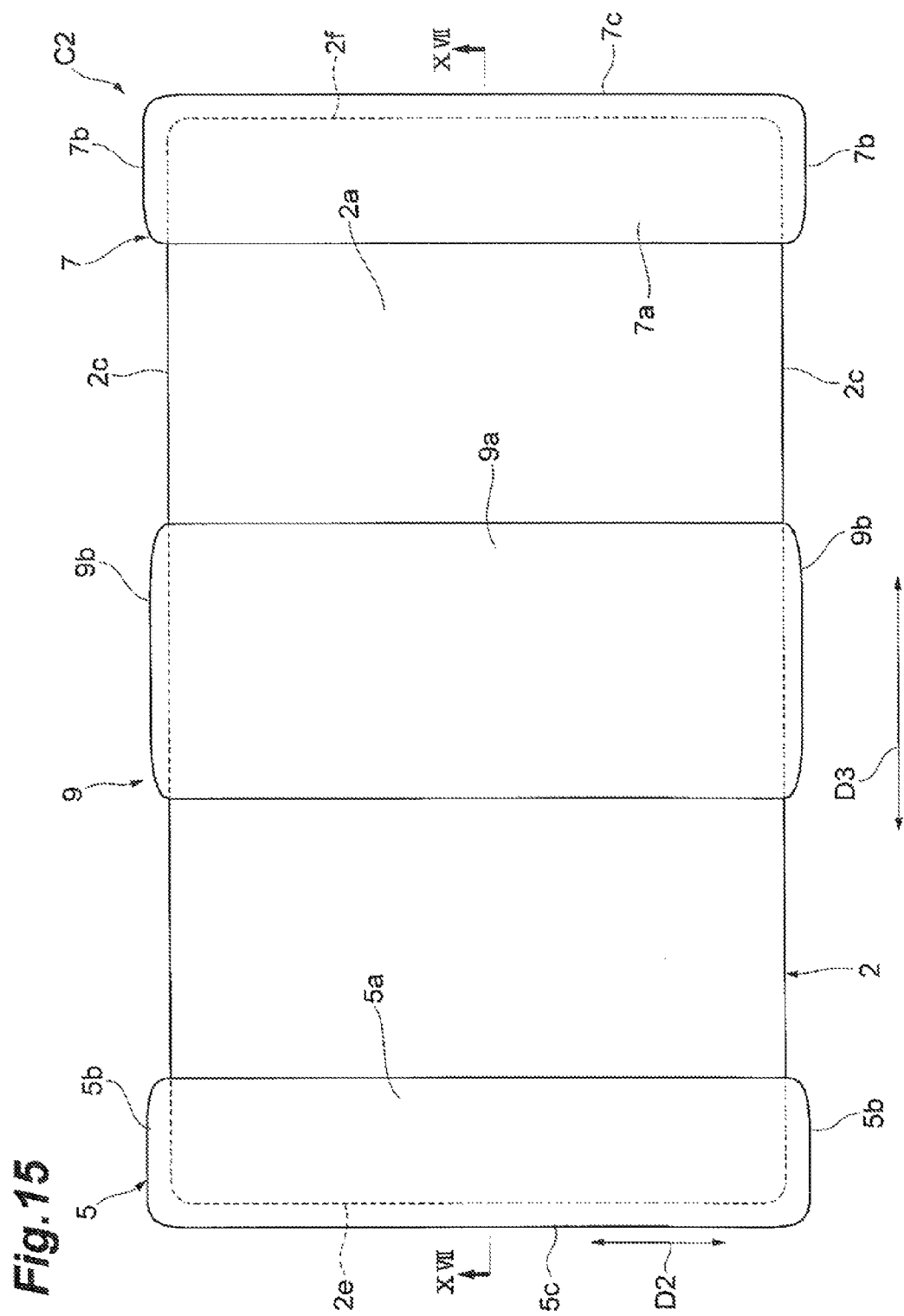
FIG. 15 is a plan view of the multilayer feedthrough capacitor according to the modification example.
Figure 16:
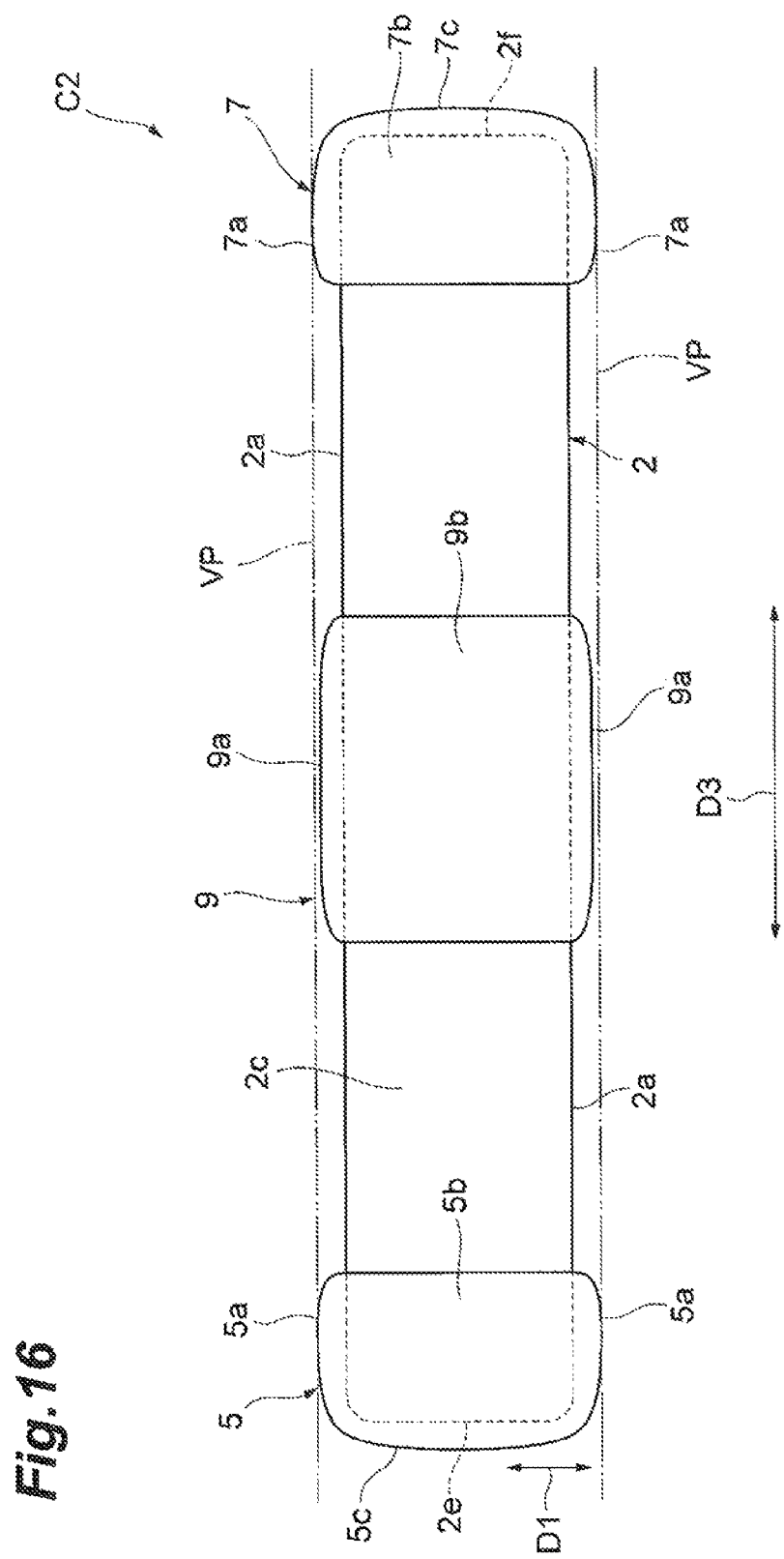
FIG. 16 is a side view of the multilayer feedthrough capacitor according to the modification example.
Figure 17:
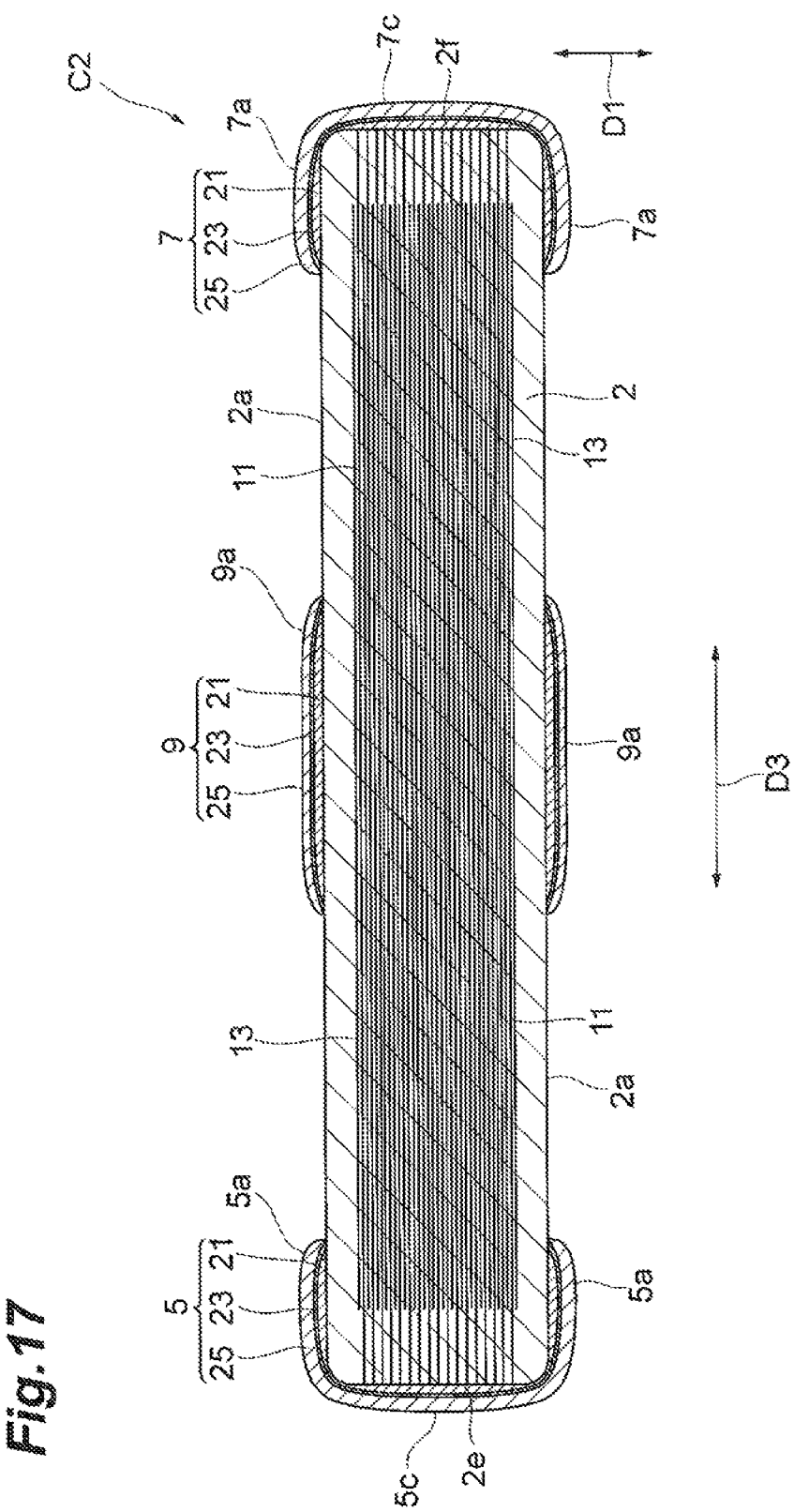
FIG. 17 is a drawing for explaining a cross-sectional configuration along the line XVII-XVII in FIG. 15.

Next, a configuration of a multilayer feedthrough capacitor C2 according to a modification example of the foregoing embodiment will be described with reference to FIGS. 14 to 17. FIG. 14 is a perspective view showing the multilayer feedthrough capacitor according to the present modification example. FIG. 15 is a plan view of the multilayer feedthrough capacitor according to the present modification example. FIG. 16 is a side view of the multilayer feedthrough capacitor according to the present modification example. FIG. 17 is a drawing for explaining a cross-sectional configuration along the line XVII-XVII in FIG. 15. The configuration in a cross section including the terminal ground electrode 9 and being parallel to the second direction D2 is the same as the cross-sectional configuration shown in FIG. 7 and thus illustration thereof is omitted herein.

The multilayer feedthrough capacitor C2, as shown in FIGS. 14 to 17, includes the element body 2, the first and second terminal signal electrodes 5, 7 and the terminal ground electrode 9, the plurality of internal signal electrodes 11, and the plurality of internal ground electrodes 13.

Figure 18:
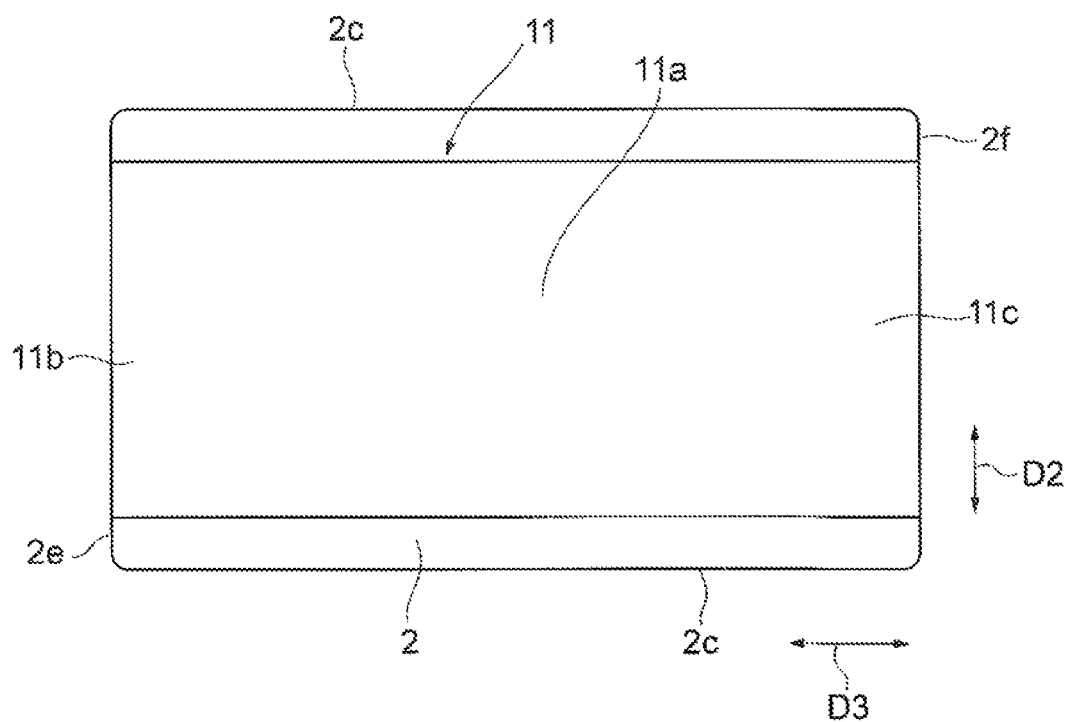
FIG. 18 is a plan view showing an internal signal electrode.

Each internal signal electrode 11, as shown in FIG. 18, includes the main electrode portion 11a, connection portion 11b, and connection portion 11c. The connection portion 11b extends from one side (one short side) of the main electrode portion 11a and is exposed at the second side surface 2e. The connection portion 11c extends from one side (the other short side) of the main electrode portion 11a and is exposed at the second side surface 2f. The internal signal electrodes 11 are exposed at the pair of first side surfaces 2e, 2f but exposed neither at the pair of principal surfaces 2a nor at the pair of first side surfaces 2c. The main electrode portion 11a and the connection portions 11b, 11c are integrally formed.

The connection portion 11b extends from the end on the second side surface 2e side of the main electrode portion 11a, to the second side surface 2e. The width of the connection portion 11b is equivalent to the width of the main electrode portion 11a. The end of the connection portion 11b is exposed at the second side surface 2e. The connection portion 11b is connected at the end exposed at the second side surface 2e, to the first terminal signal electrode 5. The connection portion 11c extends from the end on the second side surface 2f side of the main electrode portion 11a, to the second side surface 2f. The width of the connection portion 11c is equivalent to the width of the main electrode portion 11a. The end of the connection portion 11 is exposed at the second side surface 2f. The connection portion 11c is connected at the end exposed at the second side surface 2f, to the second terminal signal electrode 7.

Each internal ground electrode 13, as shown in FIG. 8B, includes the main electrode portion 13a, connection portion 13b, and connection portion 13c.

The first terminal signal electrode 5 includes the electrode portions 5a disposed on the respective principal surfaces 2a, the electrode portions 5b disposed on the respective first side surfaces 2c, and an electrode portion 5c disposed on the second side surface 2e. The electrode portion 5c and the electrode portions 5a, 5b are connected at the ridgelines of the element body 2 to be electrically connected to each other. The electrode portions 5a and the electrode portion 5c are connected at the ridgelines between the principal surfaces 2a and the second side surface 2e. The electrode portions 5b and the electrode portion 5c are connected at the ridgelines between the first side surfaces 2c and the second side surface 2e. The first terminal signal electrode 5 is formed on the five surfaces of the pair of principal surfaces 2a, the pair of first side surfaces 2c, and the second side surface 2e.

The electrode portion 5c is disposed to cover all exposed portions of the respective connection portions 11b at the second side surface 2e. The connection portions 11b are directly connected to the first terminal signal electrode 5. The electrode portion 5c is formed to cover the whole of the second side surface 2e.

The second terminal signal electrode 7 includes the electrode portions 7a disposed on the respective principal surfaces 2a, the electrode portions 7b disposed on the respective first side surfaces 2c, and an electrode portion 7c disposed on the second side surface 2f. The electrode portion 7c and the electrode portions 7a, 7b are connected at the ridgelines of the element body 2 to be electrically connected to each other. The electrode portions 7a and the electrode portion 7c are connected at the ridgelines between the principal surfaces 2a and the second side surface 2f. The electrode portions 7b and the electrode portion 7c are connected at the ridgelines between the first side surfaces 2c and the second side surface 2f. The first terminal signal electrode 7 is formed on the five surfaces of the pair of principal surfaces 2a, the pair of first side surfaces 2c, and the second side surface 2f.

The electrode portion 7c is disposed to cover all exposed portions of the respective connection portions 11c at the second side surface 2f. The connection portions 11c are directly connected to the second terminal signal electrode 7. The electrode portion 7c is formed to cover the whole of the second side surface 2f.

The lengths in the second direction D2 of the first electrode layers 21 of the respective electrode portions 5a, 5c, 7a, and 7c are equivalent. The lengths in the first direction D1 of the first electrode layers 21 of the respective electrode portions 5a, 5c, 7a, and 7c are also equivalent.

An area of the first electrode layer 21 of the first terminal signal electrode 5 is a total value of the areas of the first electrode layers 21 of the respective electrode portions 5a, 5b and an area of the first electrode layer 21 of the electrode portion 5c. An area of the first electrode layer 21 of the first terminal signal electrode 7 is a total value of the areas of the first electrode layers 21 of the respective electrode portions 7a, 7b and an area of the first electrode layer 21 of the electrode portion 7c. In the present modification example as well, the area of the first electrode layer 21 of the first terminal signal electrode 5 is equivalent to the area of the first electrode layer 21 of the second terminal signal electrode 7. The area of the first electrode layer 21 of the terminal ground electrode 9 is smaller than a total value of the area of the first electrode layer 21 of the first terminal signal electrode 5 and the area of the first electrode layer 21 of the second terminal signal electrode 7.

In the present modification example as well, the multilayer feedthrough capacitor C2 is obtained that has reduced height and the multilayer feedthrough capacitor C2 is realized that is suitable for built-in mounting in a substrate. The multilayer feedthrough capacitor C2 can be electrically connected to the wiring formed on the substrate, on the one principal surface 2a side of the element body 2, on the other principal surface 2a side of the element body 2, or, on both of the two principal surface 2a sides of the element body 2. Therefore, the multilayer feedthrough capacitor C2 can be readily built into the substrate.

In the present modification example as well, since the thickness of the electrode portion 9a is smaller than the thicknesses of the respective electrode portions 5a, 7a, the resin will be likely to flow to around the terminal ground electrode 9, in a process of filling the space around the multilayer feedthrough capacitor C2 with the resin. It can suppress generation of the air gap around the terminal ground electrode 9, in the process of filling the space around the multilayer feedthrough capacitor C2 with the resin. As a result, it is feasible to suitably build the multilayer feedthrough capacitor C2 into the substrate.

Figure 19:
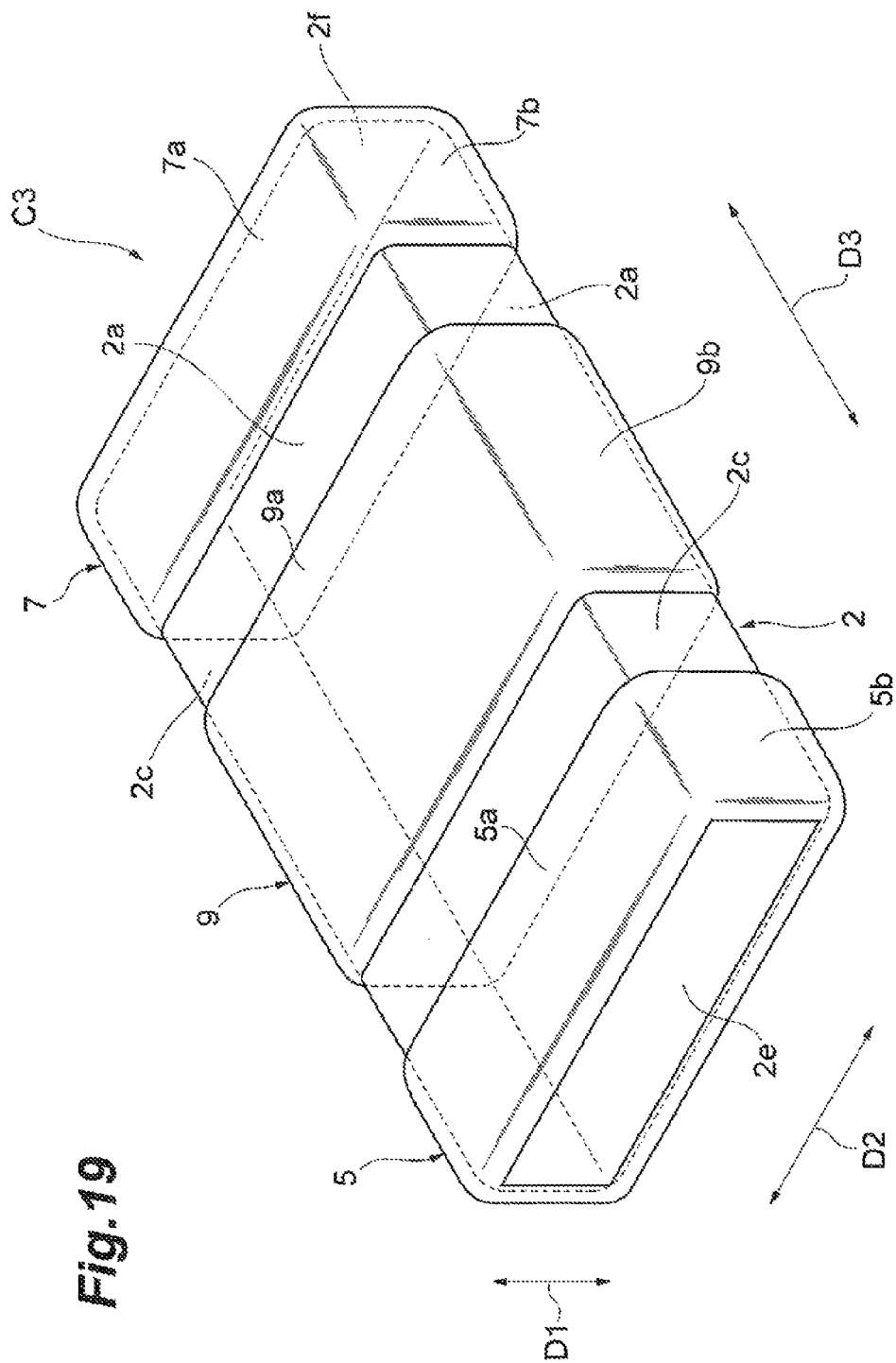
FIG. 19 is a perspective view showing a multilayer feedthrough capacitor according to another modification example of the embodiment.
Figure 20:
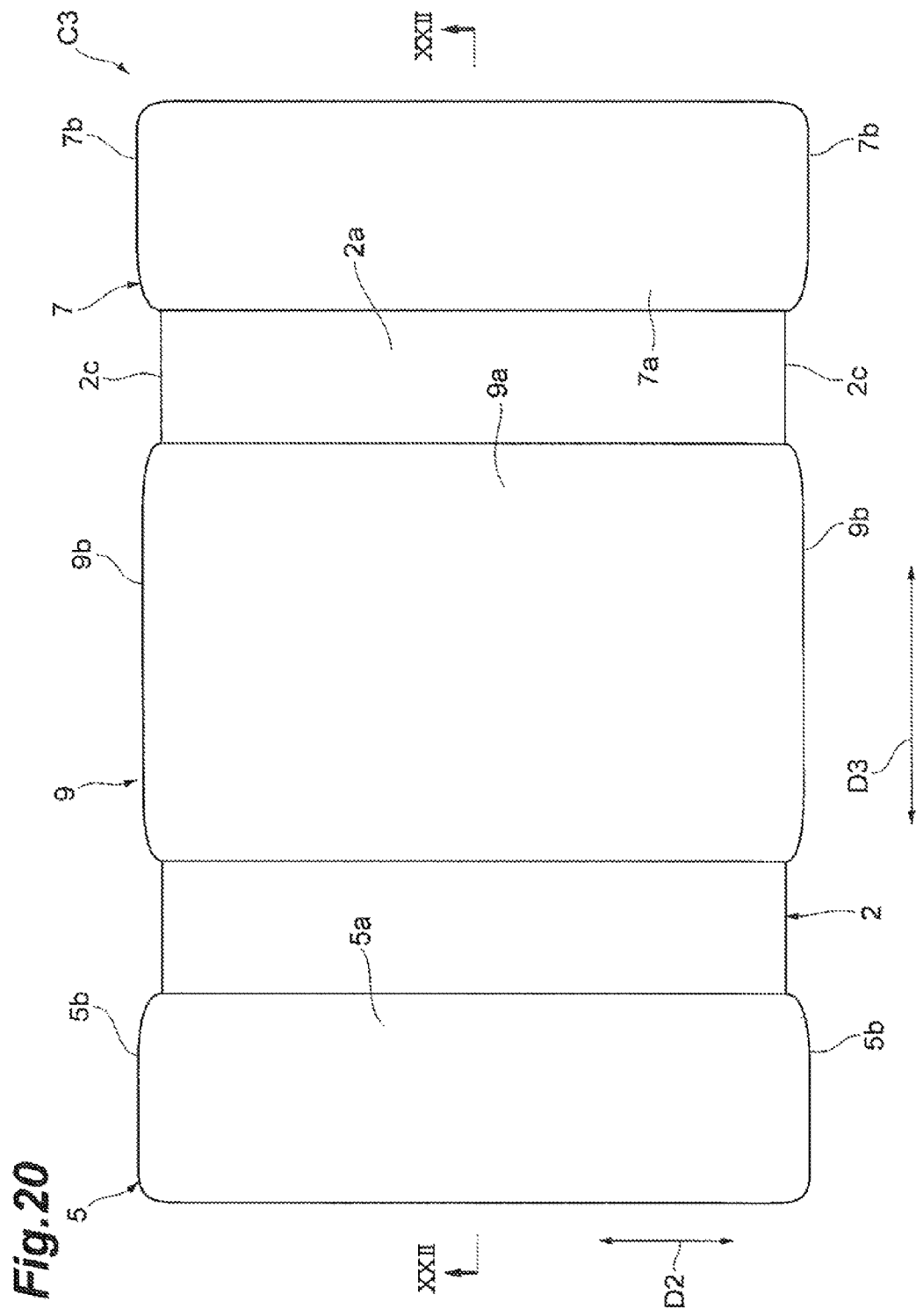
FIG. 20 is a plan view of the multilayer feedthrough capacitor according to the modification example.
Figure 21:
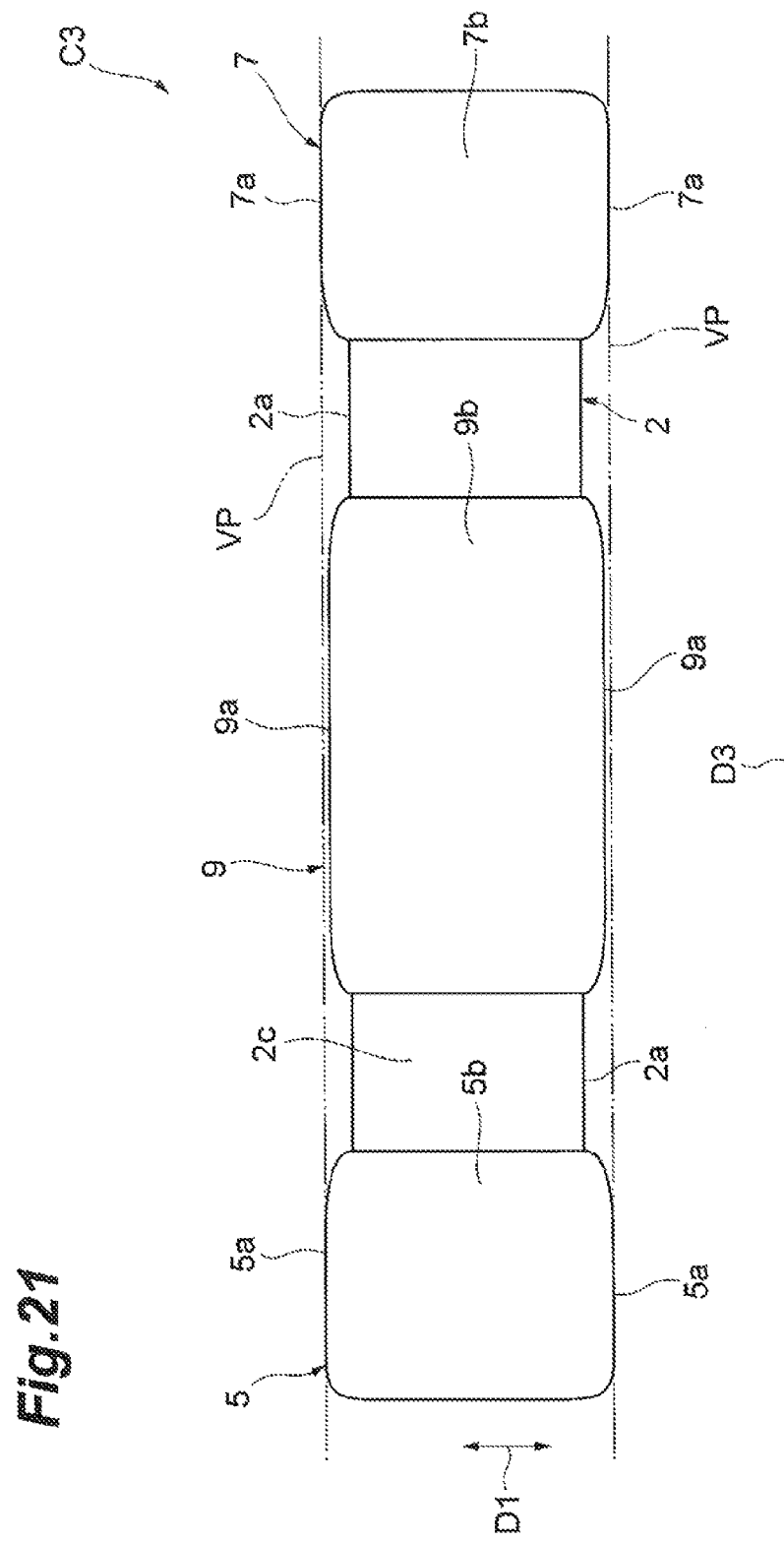
FIG. 21 is a side view of the multilayer feedthrough capacitor according to the modification example.
Figure 22:
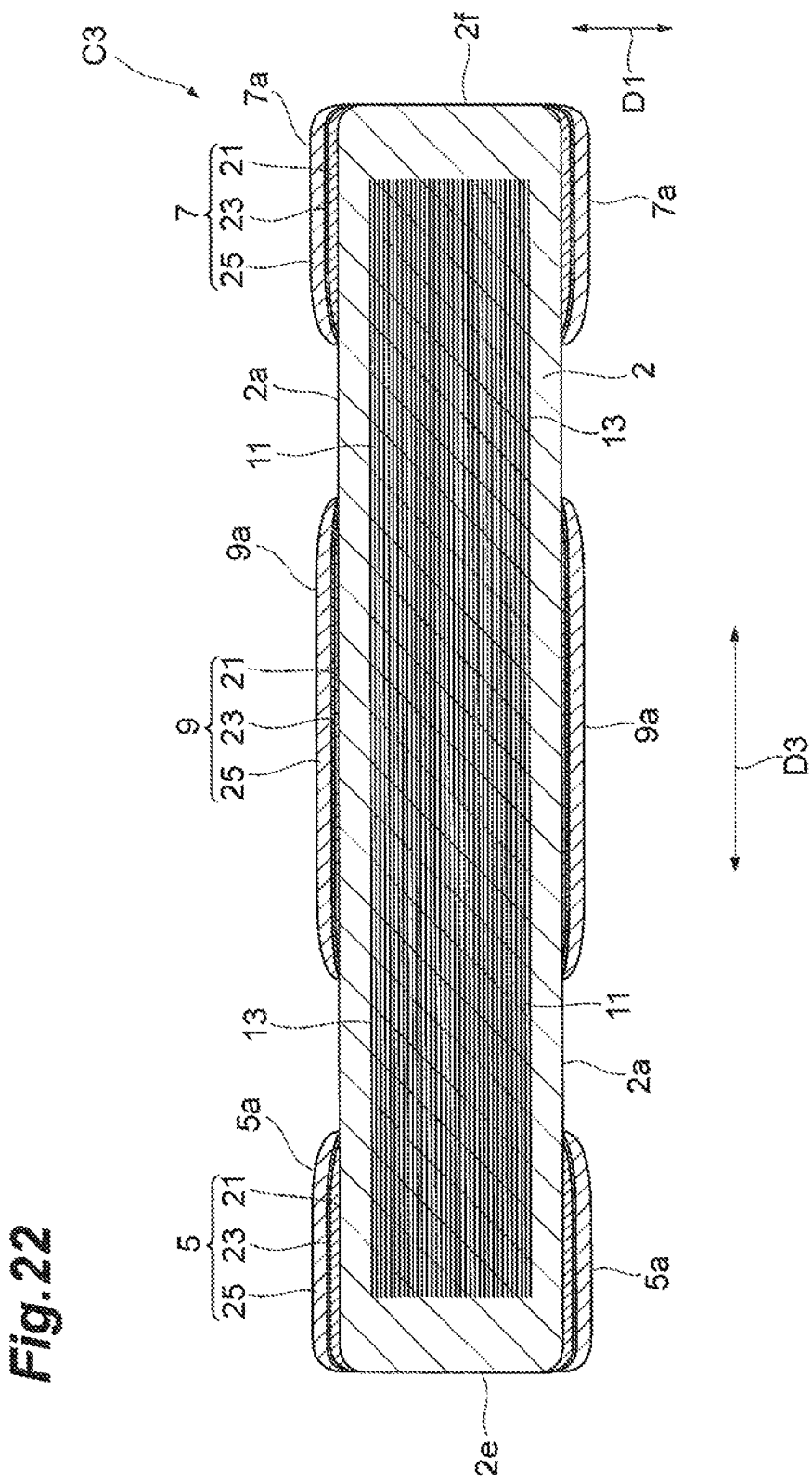
FIG. 22 is a drawing for explaining a cross-sectional configuration along the line XXII-XXII in FIG. 20.
Figure 24:
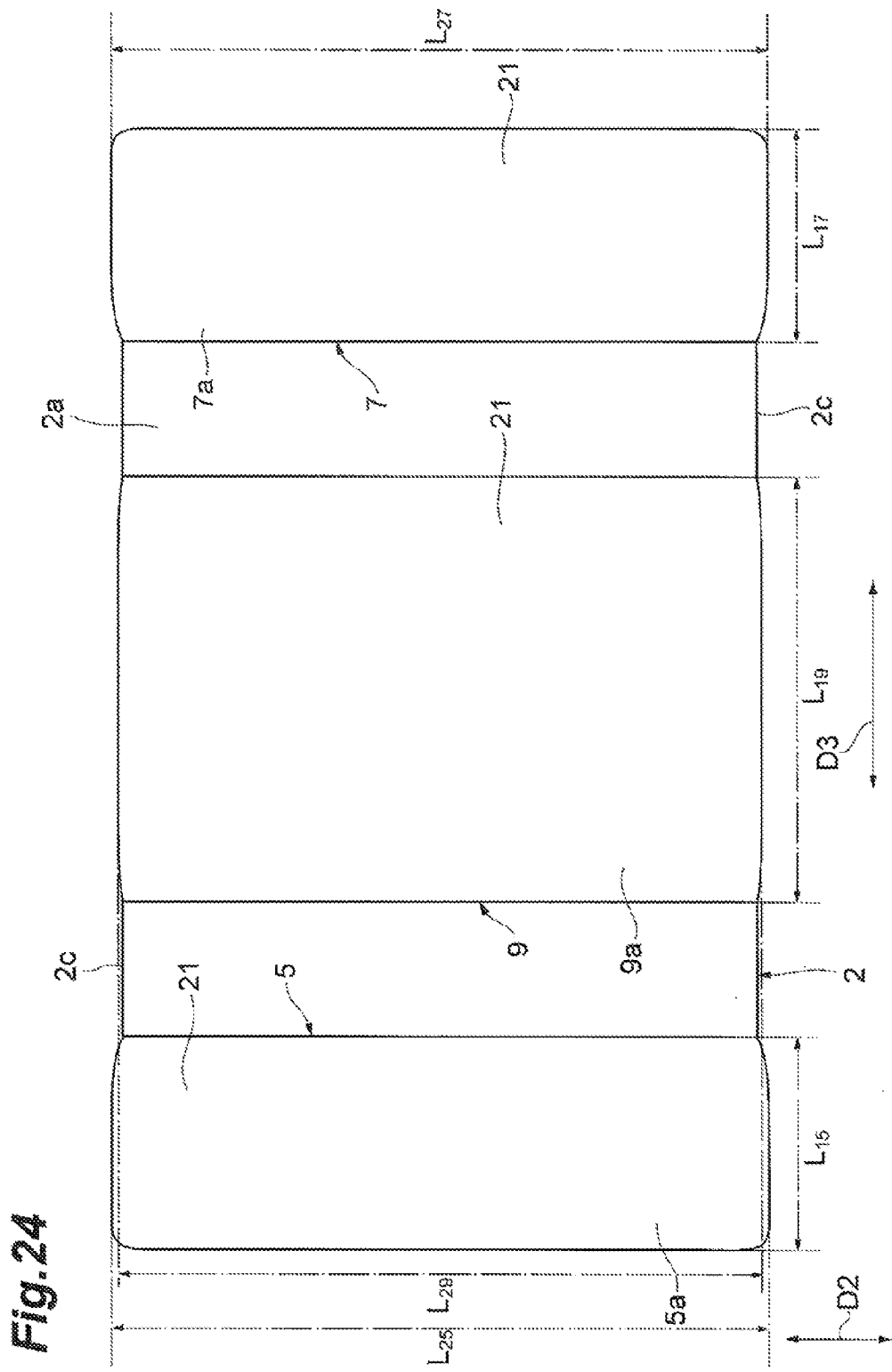
FIG. 24 is a plan view of an element body on which first electrode layers are formed.

Next, a configuration of a multilayer feedthrough capacitor C3 according to another modification example of the foregoing embodiment will be described with reference to FIGS. 19 to 22. FIG. 19 is a perspective view showing the multilayer feedthrough capacitor according to the present modification example. FIG. 20 is a plan view of the multilayer feedthrough capacitor according to the present modification example. FIG. 21 is a side view of the multilayer feedthrough capacitor according to the present modification example. FIG. 22 is a drawing for explaining a cross-sectional configuration along the line XXII-XXII in FIG. 20. The configuration in a cross section including the first terminal signal electrode 5 and being parallel to the second direction D2 is the same as the cross-sectional configuration shown in FIG. 5 and thus illustration thereof is omitted herein. The configuration in a cross section including the second terminal signal electrode 7 and being parallel to the second direction D2 is the same as the cross-sectional configuration shown in FIG. 6 and thus illustration thereof is omitted herein. The cross-sectional configuration including the terminal ground electrode 9 is the same as the cross-sectional configuration shown in FIG. 7 and thus illustration thereof is omitted herein.

The multilayer feedthrough capacitor C3, as shown in FIGS. 19 to 22, includes the element body 2, the first and second terminal signal electrodes 5, 7 and the terminal ground electrode 9, the plurality of internal signal electrodes 11, and the plurality of internal ground electrodes 13.

The first terminal signal electrode 5 includes the electrode portions 5a disposed on the respective principal surfaces 2a and the electrode portions 5b disposed on the respective first side surfaces 2c. The second terminal signal electrode 7 includes the electrode portions 7a disposed on the respective principal surfaces 2a and the electrode portions 7b disposed on the respective first side surfaces 2c. The terminal ground electrode 9 includes the electrode portions 9a disposed on the respective principal surfaces 2a and the electrode portions 9b disposed on the respective first side surfaces 2c.

Next, the thicknesses of the respective electrode portions 5a, 7a, 9a of the first and second terminal signal electrodes 5, 7 and the terminal ground electrode 9 will be described with reference to FIGS. 23A, 23B, and 23C.

The thickness $T_{9S1}$ of the first electrode layer 21 of the electrode portion 9a is smaller than the thickness $T_{5S1}$ of the first electrode layer 21 of the electrode portion 5a and smaller than the thickness $T_{7S1}$ of the first electrode layer 21 of the electrode portion 7a. The thickness $T_{5P1}$ of the second electrode layer 23 of the electrode portion 5a, the thickness $T_{7P1}$ of the second electrode layer 23 of the electrode portion 7a, and the thickness $T_{9P1}$ of the second electrode layer 23 of the electrode portion 9a are equivalent. The thickness $T_{5P2}$ of the third electrode layer 25 of the electrode portion 5a, the thickness $T_{7P2}$ of the third electrode layer 25 of the electrode portion 7a, and the thickness $T_{9P2}$ of the third electrode layer 25 of the electrode portion 9a are equivalent The thickness $(T_{5P1}+T_{5P2})$ of the plated layers of the electrode portion 5a, the thickness $(T_{7P1}+T_{7P2})$ of the plated layers of the electrode portion 7a, and the thickness $(T_{9P1}+T_{9P2})$ of the plated layers of the electrode portion 9a are equivalent.

The thickness $(T_{9S1}+T_{9P1}+T_{9P2})$ of the electrode portion 9a is smaller than the thickness $(T_{5S1}+T_{5P1}+T_{5P2})$ of the electrode portion 5a and smaller than the thickness $(T_{7S1}+T_{7P1}+T_{7P2})$ of the electrode portion 7a. In the present modification example as well, the thickness $(T_{9S1}+T_{9P1}+T_{9P2})$ of the electrode portion 9a is not more than 90% of the thickness $(T_{5S1}+T_{5P1}+T_{5P2})$ of the electrode portion 5a and not more than 90% of the thickness $(T_{5S1}+T_{7P1}+T_{7P2})$ of the electrode portion 7a. Each of the thicknesses $T_{5S1}$, $T_{7S1}$ is, for example, 10 μm. The thickness $T_{9S1}$ is, for example, 7 μm. Each of the thicknesses $T_{5P1}$, $T_{7P1}$, $T_{9P1}$ is, for example, 3.5 μm. Each of the thicknesses $T_{5P2}$, $T_{7P2}$, $T_{9P2}$ is, for example, 10 μm.

Next, the areas of the first electrode layers 21 of the first and second terminal signal electrodes 5, 7 and the terminal ground electrode 9 will be described with reference to FIGS. 20, 21, 24, and 25.

The length $L_{15}$ in the third direction D3 of the first electrode layer 21 of each electrode portion 5a, 5b and the length $L_{17}$ in the third direction D3 of the first electrode layer 21 of each electrode portion 7a, 7b are equivalent. The length $L_{19}$ in the third direction D3 of the first electrode layer 21 of each electrode portion 9a, 9b is equivalent to the total value of the length $L_{15}$ and the length $L_{17}$. In the present modification example, the length $L_{19}$ is twice each length $L_{15}$, $L_{17}$.

The length $L_{25}$ in the second direction D2 of the first electrode layer 21 of the electrode portion 5a and the length $L_{27}$ in the second direction D2 of the first electrode layer 21 of the electrode portion 7a are equivalent. Precisely, the length $L_{29}$ in the second direction D2 of the first electrode layer 21 of the electrode portion 9a is smaller than each of the lengths $L_{25}$, $L_{27}$, by the degree of a difference between the thickness $T_{9S1}$ and each thickness $T_{5S1}$, $T_{7S1}$. However, the difference between each length $L_{25}$, $L_{27}$ and the length $L_{29}$ is extremely smaller than each of the lengths $L_{25}$, $L_{27}$, $L_{29}$, and thus the length $L_{29}$ may be approximated to each length $L_{25}$, $L_{27}$ when the areas of the first electrode layers 21 of the respective terminal electrodes 5, 7, 9 are calculated.

The length $L_{35}$ in the first direction D1 of the first electrode layer 21 of the electrode portion 5a and the length $L_{37}$ in the first direction D1 of the first electrode layer 21 of the electrode portion 7a are equivalent. Precisely, the length $L_{39}$ in the first direction D1 of the first electrode layer 21 of the electrode portion 9a is smaller than each of the lengths $L_{35}$, $L_{37}$, by the degree of a difference between the thickness $T_{9S1}$ and each thickness $T_{5S1}$, $T_{7S1}$. However, the difference between each length $L_{35}$, $L_{37}$ and the length $L_{39}$ is extremely smaller than each of the lengths $L_{35}$, $L_{37}$, $L_{39}$, and thus the length $L_{39}$ may be approximated to each length $L_{35}$, $L_{37}$ when the areas of the first electrode layers 21 of the respective terminal electrodes 5, 7, 9 are calculated.

The area of the first electrode layer 21 of the first terminal signal electrode 5 is equivalent to the area of the first electrode layer 21 of the second terminal signal electrode 7. The area of the first electrode layer 21 of the terminal ground electrode 9 is equivalent to the total value of the area of the first electrode layer 21 of the first terminal signal electrode 5 and the area of the first electrode layer 21 of the second terminal signal electrode 7. In the present modification example, the area of the first electrode layer 21 of the terminal ground electrode 9 is twice the area of the first electrode layer 21 of the first terminal signal electrode 5S and is twice the area of the first electrode layer 21 of the second terminal signal electrode 7.

In the present modification example as well, the multilayer feedthrough capacitor C3 is obtained that has reduced height and the multilayer feedthrough capacitor C3 is realized that is suitable for built-in mounting in a substrate. The multilayer feedthrough capacitor C3 can be electrically connected to the wiring formed on the substrate, on the one principal surface 2a side of the element body 2, on the other principal surface 2a side of the element body 2, or, on both of the two principal surface 2a sides of the element body 2. Therefore, the multilayer feedthrough capacitor C3 can be readily built into the substrate.

In the present modification example as well, the thickness $(T_{9S1}+T_{9P1}+T_{9P2})$ of the electrode portion 9a is smaller than the thickness $(T_{5S1}+T_{5P1}+T_{5P2})$ of the electrode portion 5a and smaller than the thickness $(T_{7S1}+T_{7P1}+T_{7P2})$ of the electrode portion 7a. Therefore, the resin will be likely to flow to around the terminal ground electrode 9, in a process of filling the space around the multilayer feedthrough capacitor C3 with the resin. It can suppress generation of the air gap around the terminal ground electrode 9, in the process of filling the space around the multilayer feedthrough capacitor C3 with the resin. As a result, it is feasible to suitably build the multilayer feedthrough capacitor C3 into the substrate.

In the present modification example, the total value of the area of the first electrode layer 21 of the first terminal signal electrode 5 and the area of the first electrode layer 21 of the second terminal signal electrode 7 is equivalent to the area of the first electrode layer 21 of the terminal ground electrode 9. The thicknesses $(T_{5P1}+T_{5P2}, T_{7P1}+T_{7P2}, T_{9P1}+T_{9P2})$ of the respective plated layers (second and third electrode layer 23, 25) formed on the first electrode layers 21 of the electrode portions 5a, 7a, 9a are equivalent. The thickness of the first electrode layer 21 of the electrode portion 9a is smaller than the thicknesses of the first electrode layers 21 of the respective electrode portions 5a, 7a.

Because of these, the thickness $(T_{9S1}+T_{9P1}+T_{9P2})$ of the electrode portion 9a is smaller than the thickness $(T_{5S1}+T_{5P1}+T_{5P2})$ of the electrode portion 5a and smaller than the thickness $(T_{7S1}+T_{7P1}+T_{7P2})$ of the electrode portion 7a. As the areas of the respective terminal electrodes 5, 7, 9 and the thicknesses of the respective first electrode layers 21 are set in the above-described relationships, the thickness of the electrode portion 9a can be readily made smaller than the thicknesses of the respective electrode portions 5a, 7a.

In the present modification example, since the total value of the area of the first electrode layer 21 of the first terminal signal electrode 5 and the area of the first electrode layer 21 of the second terminal signal electrode 7 is equivalent to the area of the first electrode layer 21 of the terminal ground electrode 9, the total value of the area of the first terminal signal electrode 5 and the area of the second terminal signal electrode 7 is equivalent to the area of the terminal ground electrode 9.

The embodiment of the present invention has been described above, but it should be noted that the present invention is not always limited only to the above-described embodiment but can be modified in many ways without departing from the spirit and scope of the invention.

The first and second terminal signal electrodes 5, 7 and the terminal ground electrode 9 do not always have to include the pair of electrode portions 5a, 7a, 9a. The electrode portions 5a, 7a, 9a may be disposed on either one principal surface 2a of the pair of principal surfaces 2a.

Figure 26A:
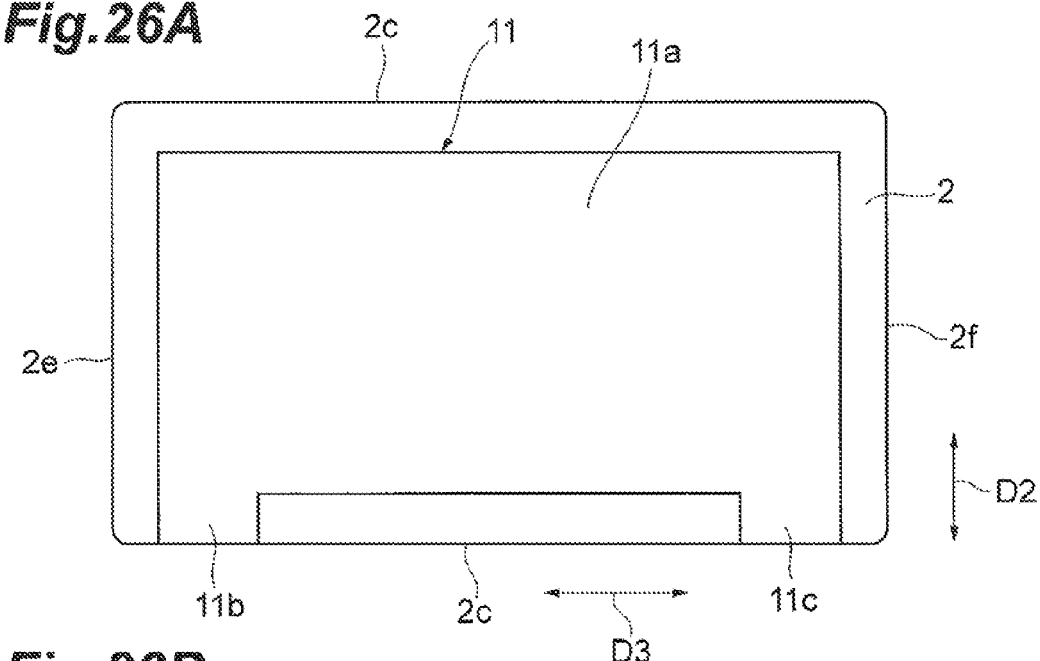
FIG. 26A is a plan view showing a modification example of the internal signal electrode and FIG. 26B a plan view showing a modification example of the internal ground electrode.
Figure 26B:
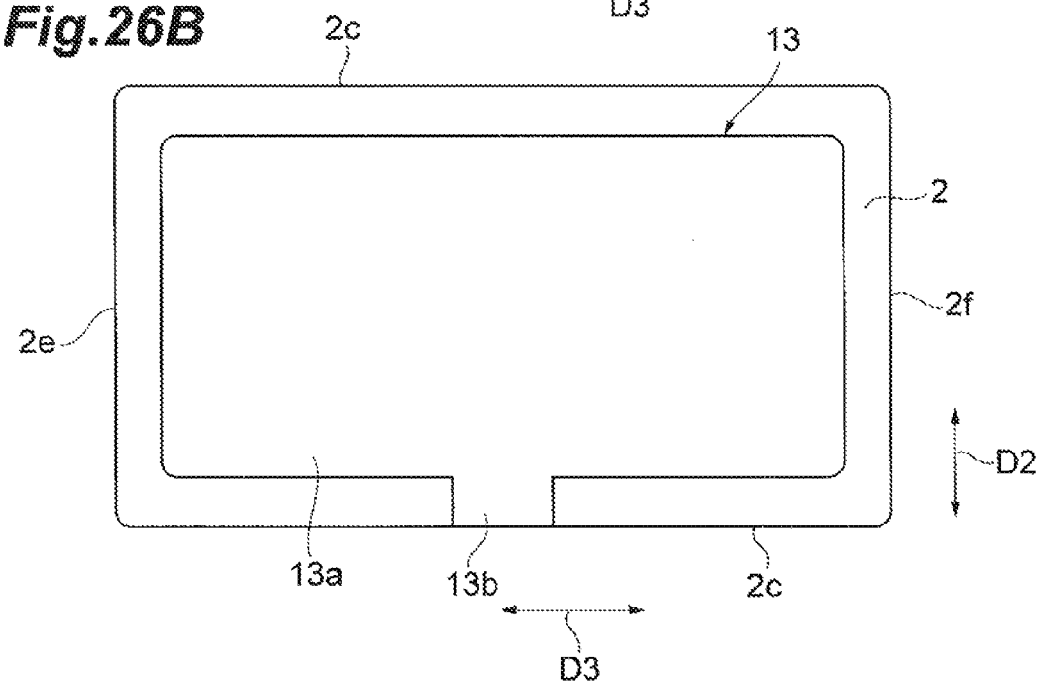

The shapes of the internal signal electrodes 11 and the internal ground electrodes 13 are not limited to those in the foregoing embodiment and modification examples. For example, the internal signal electrodes 11 and internal ground electrodes 13 may be arranged not to be exposed at the other first side surface 2c, as shown in FIGS. 26A and 26B. In this case, each internal signal electrode 11 includes the main electrode portion 11a and the pair of connection portions 11b, 11 exposed at the one first side surface 2c. Each internal ground electrode 13 includes the main electrode portion 13a and one connection portion 13b exposed at the one first side surface 2c. The first and second terminal signal electrodes 5, 7 and the terminal ground electrode 9 may be configured without any electrode portion on the other first side surface 2c.

FIG. 13 shows the configuration wherein the multilayer feedthrough capacitor C1 is embedded in the substrate 31, but the multilayer feedthrough capacitor C2 or C3 may be mounted as embedded in the substrate 31.

What is claimed is:

1. A multilayer feedthrough capacitor comprising:
an element body of a rectangular parallelepiped shape, the element body including a pair of principal surfaces opposing each other in a first direction, a pair of first side surfaces opposing each other in a second direction perpendicular to the first direction, and a pair of second side surfaces opposing each other in a third direction perpendicular to the first and second directions;
a plurality of internal signal electrodes and internal ground electrodes alternately disposed in the element body to oppose each other in the first direction;
first and second terminal signal electrodes disposed on the element body and connected to the plurality of internal signal electrodes; and
a terminal ground electrode disposed on the element body and connected to the plurality of internal ground electrodes,
wherein a length in the first direction of the element body is smaller than a length in the second direction of the element body and smaller than a length in the third direction of the element body,
wherein the terminal ground electrode is located between the first terminal signal electrode and the second terminal signal electrode in the third direction, wherein each of the first and second terminal signal electrodes and the terminal ground electrode includes an electrode portion disposed on one of the principal surfaces, wherein a thickness of the electrode portion of the terminal ground electrode is smaller than a thickness of the electrode portion of the first terminal signal electrode and smaller than a thickness of the electrode portion of the second terminal signal electrode, wherein each of the first and second terminal signal electrodes and the terminal ground electrode includes a sintered conductor layer formed on the element body, and a plated layer formed on the sintered conductor layer, wherein a thickness of the sintered conductor layer of the electrode of the terminal ground electrode is not more than a thickness of the sintered conductor layer of the electrode portion of the first terminal signal electrode and not more than a thickness of the sintered conductor layer of the electrode portion of the second terminal signal electrode, and wherein an area of the sintered conductor layer of the terminal ground electrode is smaller than a total value of an area of the sintered conductor layer of the first terminal signal electrode and an area of the sintered conductor layer of the second terminal signal electrode.

2. The multilayer feedthrough capacitor according to claim 1, wherein the thickness of the electrode portion of the terminal ground electrode is not more than 90% of the thickness of the electrode portion of the first terminal signal electrode and is not more than 90% of the thickness of the electrode portion of the second terminal signal electrode.

3. The multilayer feedthrough capacitor according to claim 1, wherein the sintered conductor layer contains Cu or Ni, wherein the plated layer includes a first plated layer formed on the sintered conductor layer, and a second plated layer formed on the first plated layer, wherein the first plated layer contains Ni or Sn, and wherein the second plated layer contains Cu or Au.

4. The multilayer feedthrough capacitor according to claim 1, wherein each of the first and second terminal signal electrodes and the terminal ground electrode further includes an electrode portion disposed on one of the first side surfaces, wherein each of the plurality of internal signal electrodes includes a pair of connection portions connected to the respective electrode portions of the first and second terminal signal electrodes disposed on the one first side surface, wherein each of the plurality of internal ground electrodes includes a connection portion connected to the electrode portion of the terminal ground electrode disposed on the one first side surface, and wherein the connection portions of the internal signal electrodes and the connection portions of the internal ground electrodes are exposed at the one first side surface.

5. The multilayer feedthrough capacitor according to claim 1, wherein each of the first and second terminal signal electrodes and the terminal ground electrode further includes an electrode portion disposed on another of the principal surfaces.

6. The multilayer feedthrough capacitor according to claim 1, wherein each of the first and second terminal signal electrodes and the terminal ground electrode further includes electrode portions disposed on the pair of first side surfaces, and an electrode portion disposed on another of the principal surfaces, wherein the electrode portion disposed on the one principal surface and the electrode portion disposed on each of the first side surfaces are connected at a ridgeline between the one principal surface and each first side surface, wherein the electrode portion disposed on the other principal surface and the electrode portion disposed on each of the first side surfaces are connected at a ridgeline between the other principal surface and each first side surface, wherein each of the plurality of internal signal electrodes includes a pair of connection portions connected to the respective electrode portions of the first terminal signal electrode disposed on the pair of first side surfaces, and a pair of connection portions connected to the respective electrode portions of the second terminal signal electrode disposed on the pair of first side surfaces, wherein each of the plurality of internal ground electrodes includes connection portions connected to the electrode portions of the terminal ground electrode disposed on the pair of first side surfaces, and wherein the connection portions of the respective internal signal electrodes and the connection portions of the respective internal ground electrodes are exposed at the pair of first side surfaces.

7. The multilayer feedthrough capacitor according to claim 1, wherein the first and second terminal signal electrodes are disposed at ends in the third direction of the element body and include no electrode portion disposed on either of the second side surfaces.

8. The multilayer feedthrough capacitor according to claim 1, wherein an area of the terminal ground electrode is smaller than a total value of an area of the first terminal signal electrode and an area of the second terminal signal electrode.

9. A multilayer feedthrough capacitor compromising:

an element body of a rectangular parallelepiped shape, the element body including a pair of principal surfaces opposing each other in a first direction, a pair of first side surfaces opposing each other in a second direction perpendicular to the first direction, and a pair of second side surfaces opposing each other in a third direction perpendicular to the first and second directions;

a plurality of internal signal electrodes and internal ground electrodes alternately disposed in the element body to oppose each other in the first direction;

first and second terminal signal electrodes disposed on the element body and connected to the plurality of internal signal electrodes; and a terminal ground electrode disposed on the element body and connected to the plurality of internal ground electrodes, wherein a length in the first direction of the element body is smaller than a length in the second direction of the element body and smaller than a length in the third direction of the element body, wherein the terminal ground electrode is located between the first terminal signal electrode and second terminal signal electrode in the third direction, wherein each of the first and second terminal electrodes and the terminal ground electrode includes an electrode portion disposed on one of the principal surfaces, wherein a thickness of the electrode portion of the terminal ground electrode is smaller than a thickness of the electrode portion of the first terminal signal electrode and smaller than a thickness of the electrode portion of the second terminal signal electrode, wherein each of the first and second terminal signal electrodes and the terminal ground electrode includes a sintered conductor layer formed on the element body, and a plated layer formed on the sintered conductor layer, wherein a thickness of the sintered conductor layer of the electrode portion of the terminal ground electrode is smaller than a thickness of the sintered conductor layer of the electrode portion of the first terminal signal electrode and smaller than a thickness of the sintered conductor layer of the electrode portion of the second terminal signal electrode, and wherein an area of the sintered conductor layer of the terminal ground electrode is equivalent to a total value of an area of the sintered conductor layer of the first terminal signal electrode and an area of the sintered conductor layer of the second terminal signal electrode.

10. The multilayer feedthrough capacitor according to claim 9, wherein the sintered conductor layer contains Cu or Ni, wherein the plated layer includes a first plated layer formed on the sintered conductor layer, and a second plated layer formed on the first plated layer, wherein the first plated layer contains Ni or Sn, and wherein the second plated layer contains Cu or Au.

11. The multilayer feedthrough capacitor according to claim 9, wherein an area of the terminal ground electrode is equivalent to a total value of an area of the first terminal signal electrode and an area of the second terminal signal electrode.

12. The multilayer feedthrough capacitor according to claim 9, wherein the thickness of the electrode portion of the terminal ground electrode is not more than 90% of the thickness of the electrode portion of the first terminal signal electrode and is not more than 90% of the thickness of the electrode portion of the second terminal signal electrode.

13. The multilayer feedthrough capacitor according to claim 9, wherein each of the first and second terminal signal electrodes and the terminal ground electrode further includes an electrode portion disposed on one of the first side surfaces, wherein each of the plurality of internal signal electrodes includes a pair of connection portion connected to the respective electrode portions of the first and second terminal signal electrodes disposed on the first side surface, wherein each of the plurality of internal ground electrodes includes a connection portion connected to the electrode portion of the terminal ground electrode disposed on the one first side surface, and wherein the connection portions of the internal signal electrodes and the connection portions of the internal ground electrodes are exposed at the one first side surface.

14. The multilayer feedthrough capacitor according to claim 9, wherein each of the first and second terminal signal electrodes and the terminal ground electrode further includes an electrode portion disposed on another of the principal surfaces.

15. The multilayer feedthrough capacitor according to claim 9, wherein each of the first and second terminal signal electrodes and the terminal ground electrode further includes electrode portions disposed on the pair of first side surfaces, and an electrode portion disposed on another of the principal surfaces, wherein the electrode portion disposed on the one principal surface and the electrode portion disposed on each of the first side surfaces are connected at a ridgeline between the one principal surface and each first side surface, wherein the electrode portion disposed on the other principal surface and the electrode portion disposed on each of the first side surfaces are connected at a ridgeline between the other principal surface and each first side surface, wherein each of the plurality of internal signal electrodes includes a pair of connection portions connected to the respective electrode portions of the first terminal signal electrode disposed on the pair of first side surfaces, and a pair of connection portions connected to the respective electrode portions of the second terminal signal electrode disposed on the pair of first side surfaces, wherein each of the plurality of internal ground electrodes includes connection portions connected to the electrode portions of the terminal ground electrode disposed on the pair of first side surfaces, and wherein the connection portions of the respective internal signal electrodes and the connection portions of the respective internal ground electrodes are exposed at the pair of first side surfaces.

16. The multilayer feedthrough capacitor according to claim 9, wherein the first and second terminal signal electrodes are disposed at ends in the third direction of the element body and include no electrode portion disposed on either of the second side surfaces.

* * * * *